(12) United States Patent
Albano et al.

(10) Patent No.: US 9,402,409 B2
(45) Date of Patent: Aug. 2, 2016

(54) FROZEN POPS WITH DRINKABLE LIQUID OR EDIBLE SOLID CENTER

(71) Applicant: Shotcicle LLC, Somers Point, NJ (US)

(72) Inventors: Frank Albano, Somers Point, NJ (US); Michael Santangelo, Sicklerville, NJ (US)

(73) Assignee: Shotcicle LLC, Somers Point, NJ (US)

( * ) Notice: Subject to any disclaimer, the term of this patent is extended or adjusted under 35 U.S.C. 154(b) by 0 days.

(21) Appl. No.: 13/887,368

(22) Filed: May 5, 2013

(65) Prior Publication Data

US 2014/0065267 A1 Mar. 6, 2014

Related U.S. Application Data

(60) Provisional application No. 61/697,221, filed on Sep. 5, 2012.

(51) Int. Cl.
*A23G 9/22* (2006.01)
*A23G 9/48* (2006.01)
*A23G 9/08* (2006.01)

(52) U.S. Cl.
CPC .............. *A23G 9/221* (2013.01); *A23G 9/083* (2013.01); *A23G 9/485* (2013.01)

(58) Field of Classification Search
CPC ........... A23G 9/08; A23G 9/221; A23G 9/26; A23G 9/503; A23G 9/083; A23G 9/485; B65D 85/78
USPC .............. 425/117, 118, 126.2, 318, 438, 414, 425/458; 249/92, 93, 120, 121, 124, 127; 426/91, 134, 280, 512
See application file for complete search history.

(56) References Cited

U.S. PATENT DOCUMENTS 1,933,596 A * 11/1933 Maclean ...................... 426/115
2,001,919 A 5/1935 Nolte
(Continued)

FOREIGN PATENT DOCUMENTS

CH 620 168 A5 * 11/1980 ............... A23G 9/26
CN 2255214 Y 6/1997
(Continued)

OTHER PUBLICATIONS

Prepara™, Volcano Pop Set, http://www.bedbathandbeyond.com/store/product/prepara-reg-volcano-popsicle-molds-set-of-4/1016565040 (1 page) and www.Amazon.com/Prepara-volcano-4-Piece-Pop-Set/dp/B0026L7BLC (5 pages)(date unknown but prior to Jun. 2012.
(Continued)

*Primary Examiner* — James Sanders
*Assistant Examiner* — Leith S Shafi
(74) *Attorney, Agent, or Firm* — Flaster/Greenberg P.C.

(57) ABSTRACT

A mold for forming a frozen pop or molded treat, and a method for forming a frozen pop and frozen pops or molded treats made therefrom are described which include a female mold body defining an interior mold space and having a first open end and a second end; a base having a support surface with an opening extending longitudinally therethrough, the base configured to be positioned around or within the first end of the female mold body and to support by the support surface a frozen pop or molded treat formed in the interior space of the female mold body; and a removable male insert mold body, wherein the male insert mold body is configured to fit through the opening in the support surface in the base.

24 Claims, 14 Drawing Sheets

(56) References Cited

U.S. PATENT DOCUMENTS

| | | | |
|---|---|---|---|
| 2,166,619 A * | 7/1939 | Becker | 222/386 |
| 2,321,519 A * | 6/1943 | Rubinoff | 220/737 |
| 2,591,261 A | 4/1952 | Holahan | |
| 2,674,960 A | 4/1954 | De Pasquale | |
| 2,702,011 A | 2/1955 | Larkin | |
| 2,766,123 A * | 10/1956 | Moubayed | 426/132 |
| 2,803,550 A * | 8/1957 | Ackalusky | 426/134 |
| 2,980,039 A * | 4/1961 | Jolly | 249/97 |
| 3,342,609 A * | 9/1967 | Bank et al. | 426/110 |
| 3,432,027 A * | 3/1969 | Mueller | 206/527 |
| 3,459,296 A * | 8/1969 | Berg | 206/229 |
| 3,481,458 A * | 12/1969 | Mayeaux | 206/527 |
| 3,595,449 A * | 7/1971 | Stump et al. | 222/386 |
| 3,920,156 A * | 11/1975 | Hicks | 222/80 |
| 4,285,490 A | 8/1981 | Hanley | |
| 4,378,025 A * | 3/1983 | Gaston | 424/401 |
| 4,648,153 A * | 3/1987 | Coroneos | 425/382 R |
| 4,828,163 A * | 5/1989 | Yu | 222/386 |
| 5,111,973 A * | 5/1992 | Mueller | 222/386 |
| 5,271,244 A | 12/1993 | Staggs | |
| 5,874,119 A * | 2/1999 | Coleman et al. | 426/104 |
| 6,190,226 B1 * | 2/2001 | Conconi | 446/73 |
| 6,230,764 B1 * | 5/2001 | Rodman | 141/86 |
| RE37,213 E | 6/2001 | Staggs | |
| 6,261,611 B1 * | 7/2001 | Berman | 426/90 |
| 6,415,624 B1 | 7/2002 | Connors et al. | |
| 6,622,516 B1 | 9/2003 | Horen | |
| 6,751,982 B2 | 6/2004 | Horen | |
| 6,758,058 B1 | 7/2004 | Citrynell et al. | |
| 6,931,885 B2 | 8/2005 | Citrynell et al. | |
| 6,941,982 B1 * | 9/2005 | Swan et al. | 141/86 |
| 7,007,829 B1 * | 3/2006 | Mueller et al. | 222/386 |
| 7,074,452 B2 | 7/2006 | Lebowitz | |
| 7,093,459 B2 | 8/2006 | Citrynell et al. | |
| 7,272,935 B1 | 9/2007 | Wolf | |
| 2001/0017299 A1 * | 8/2001 | Schmarr | 220/571 |
| 2003/0087011 A1 * | 5/2003 | Perkins | 426/134 |
| 2005/0040214 A1 * | 2/2005 | Veciana I Membrado | 229/87.05 |
| 2005/0129819 A1 | 6/2005 | Lennon | |
| 2005/0142253 A1 | 6/2005 | Purcell | |
| 2005/0202138 A1 * | 9/2005 | Kazich | 426/421 |
| 2006/0040019 A1 * | 2/2006 | Cecere | A23G 3/563 426/85 |
| 2008/0279992 A1 * | 11/2008 | Kahn | 426/134 |
| 2009/0011106 A1 | 1/2009 | Givati et al. | |
| 2010/0098808 A1 | 4/2010 | Vaghela et al. | |
| 2011/0167836 A1 * | 7/2011 | Zorovich | A23G 9/221 62/1 |
| 2011/0223292 A1 * | 9/2011 | Kushner et al. | 426/134 |
| 2012/0027895 A1 * | 2/2012 | Bach | 426/110 |
| 2012/0031869 A1 | 2/2012 | Bauer | |
| 2012/0282317 A1 | 11/2012 | Ekstein | |
| 2013/0029019 A1 * | 1/2013 | Pryor et al. | 426/389 |
| 2013/0156918 A1 * | 6/2013 | Reinhardt et al. | 426/515 |

FOREIGN PATENT DOCUMENTS

| | | | | |
|---|---|---|---|---|
| CN | 1165942 A | | 11/1997 | |
| CN | 1243797 A | | 2/2000 | |
| CN | 2487234 Y | | 4/2002 | |
| CN | 2706015 Y | | 6/2005 | |
| DE | 1 296 085 B | * | 5/1969 | A23G 9/287 |
| DE | 202 18 084 U1 | | 3/2003 | |
| DE | 10 2004 007 417 A1 | | 9/2005 | |
| EP | 1856984 A1 | * | 11/2007 | A23G 9/50 |
| GB | 2 340 591 A | | 2/2000 | |
| JP | 04352638 A | * | 12/1992 | B65D 3/26 |
| JP | 03-653632 B2 | | 6/2005 | |
| WO | WO 8905764 A1 | * | 6/1989 | B65D 85/78 |

OTHER PUBLICATIONS

M, Katz, "Alcoholic Popsicles Offer Heat Relief for Grown-Ups," DNAInfo, New York City, http://www.dnainfo.com/new-york/20120611/new-york-city/alcoholic-popsicles-offer-heat-relief-for-grown-ups, Jun. 2012.

International Preliminary Examination Report, counterpart PCT/US2013/057805, Mar. 2015, 10 pages.

International Search Report and Written Opinion, counterpart PCT/US2013/057805, Feb. 2014.

Two Flavor Rocket Freezer Pop Mold, Prairie Moon, http://web.archive.org/web/20120226091955/http://www.prairiemoon.biz/twoflrofrpop.html, Feb. 2012.

* cited by examiner

FROZEN POPS WITH DRINKABLE LIQUID OR EDIBLE SOLID CENTER

CROSS REFERENCE TO RELATED APPLICATIONS

This application claims the benefit under 35 U.S.C. §119(e) to U.S. Provisional Patent Application No. 61/697,221, entitled, "Frozen Pops With Liquid Center," the entire disclosure of which is incorporated herein by reference.

BACKGROUND OF THE INVENTION

1. Field of the Invention

The invention relates to the field of frozen confections and drinks, particularly frozen solid hand held treats such as pops having a center containing liquid.

2. Description of Related Art

It is known that people commonly enjoy novelty beverages, both alcoholic and non-alcoholic, which combine flavors or provide a unique combination, such as mixed alcoholic drinks, blended smoothies, fruit combination drinks, combination specialty martinis, and the like in order to satisfy a variety of tastes and experiences.

The alcoholic beverage industry has also introduced a number of new flavored spirits, e.g., flavored vodka. Vodka, for example, because of its unique flavor which is typically served cold over ice, and blending capability has been combined with ice or used in various frozen blender drinks. Spirits such as vodka can also be combined with ice sculptures and frozen drink fountains and the like.

Other frozen treats combine textures as well as flavors, for example, when ordering water ice with soft ice cream in a gelato combination, one picks the two flavors for combination. As a result of the trend in combining flavors and textures, as well as enjoyment of frozen beverage treats, there have been prior art attempts to prepare frozen drink cups and/or pop making devices.

U.S. Pat. No. 6,622,516 of Horen describes use of an insertable hollow shaft having a handle that can be put into a drink bottle to enable a user to pour liquid into the bottle when right-side-up, and then invert it so that liquid fills the portion of the inverted bottle around the exterior of the inserted hollow cylinder shaft up to a specific level. When the liquid freezes, it forms an ice ring. The user can store the bottle with the frozen ice ring, and when ready to use it, pour a beverage through the ice ring so as to drink the beverage cold.

German Patent Publication No. 10 2004 007 417 A1 is an example of an ice cup mold. It discloses a mold that can be formed of a rubber such as silicone for forming an ice cup. The mold produces a frozen cup that can be formed of a frozen beverage or other liquid such as water. A user can drink a beverage from the empty space in the cup.

U.S. Pat. No. 4,285,490 of Hanley shows a device with an inner cup for creating a solid frozen beverage in an inner space, and an outer cup that fits over the frozen inner cup to allow for a liquid beverage to be poured and drank from an area around the exterior of the inner frozen core.

Various molds for frozen pops an also known. For example, U.S. Pat. No. 2,591,261 teaches a mold having hollow compartments form making frozen pops and a lid which includes a spike for attaching a holding stick to the frozen pop. The user is able to detach the lid (which keeps the beverage from contamination), but still check to see if it is done through a side hole. The stick may be solid or a hollow tube. PREPARA provides a plastic mold, sold as a Volcano Pop Set, for home use that prepares a single pop on a handle. The mold provides a depressed area that for ms an open well for holding a beverage inside the well. After forming the pop, a user can pour the liquid into the open well. Various similar pop mold for forming shaped pops are known for home and industrial use.

In industrial frozen pop formation, pops are formed in industrial mold on a stick, typically a wood stick approved for food contact and packaged in a paper or plastic sheath or wrapper. Frozen ice cream cones in tear away wrappers are also available pre-frozen for consumer purchase.

U.S. Patent Publication No. 2009/0011106 A1 discloses devices that enable frozen treats to stay frozen longer in warm conditions. A tray is provided that may include a cooling gel, water or other liquid in the hollow of the tray to keep a popsicle colder longer in the tray so that the user has time to eat it before it melts. In certain embodiments, hollow walls to shape popsicles can include liquid for cooling inside the open space defined within hollow mold walls to keep the popsicles cooler longer in the mold. A hollow core may also be provided on the interior of a popsicle using an extension off of the popsicle stick so as to provide a frozen interior core stick to maintain the popsicle in a frozen condition longer than an ordinary popsicle. A drip tray may also be provided that has a hollow interior to assist in keeping the frozen popsicle cold and resist melting longer. Liquids useful for freezing in the hollow cores, cases and molds includes freezing gels and other edible and non-edible liquids. Edible liquids may be sucked out of a drain/fill hole for the frozen core fluid after the popsicle is done and the core liquid has finally melted to a liquid.

There is a continued need for innovative new that provide novelty benefit or enable new and varied frozen treats for use in the food and beverage industry.

BRIEF SUMMARY OF THE INVENTION

The present invention enables a user to enjoy treats of a single flavor and/or texture or treats of varied flavor combinations and textures. In a preferred embodiment, it enables a user to form a frozen pop treat having a liquid beverage and/or solid food core. Thus, the user can combine separate flavors as well as separate textures such as a frozen outer pop with an inner drink, candy or combination of these items in the core to provide a wide variety of beverage and treat combinations. The invention can be used for restaurants and bars, as well as other establishments, or for home use, to take advantage of the beverage trends incorporating flavored spirits, liqueurs and the like with a growing desire for multi-flavored and multi-textured treats.

The invention can provide a fun and easy way to enjoy a frozen pop with a liquor center core that may further have solid foods mixed into the frozen pop prior to freezing and/or added in the center core space. Frozen pop treats having a non-alcoholic beverage-based center which are fun for children and adults can also within the scope of the invention. Various flavor combinations are possible and within the choice of the user, and the invention can thus include and form new frozen dessert novelty treats.

In one embodiment, the invention includes a mold for forming a frozen pop or molded treat, comprising a female mold body defining an interior mold space and having a first open end and a second end; a base having a support surface with an opening extending longitudinally therethrough, the base configured to be positioned around or within the first end of the female mold body and to support by the support surface a frozen pop or molded treat formed in the interior space of the female mold body; and a removable male insert mold body, wherein the male insert mold body is configured to be positioned within the female mold body in general longitudinal alignment with the opening in the support surface of the base.

The base may comprise a base connector piece. The mold may also further comprise a receptacle having a first end having an opening therein and an interior space configured for holding a liquid, the first end of the receptacle also having a receptacle connector piece configured to mate with the base connector piece for connecting the base to the receptacle. The receptacle connector piece and the base connector piece are preferably releasably connectable to each other.

The base may also comprises an upper projection defining a passage therethrough, wherein the passage is in communication with the opening in the base.

The female mold body is preferably closed at the second end so as to receive a liquid for freezing or for forming a solid treat within the interior mold space of the female mold body.

The female mold body may comprise one or more of a polymer material, an elastomer material, a paper material, a cardboard material, a foil material and combinations and laminates thereof. The female mold body material may comprise a disposable material. The female mold body may also be formed of a frangible material. The female mold body also may comprise perforations for tearing and easy removal of the female mold body after using the mold to form a frozen pop or a molded treat within the interior mold space of the female mold body. The support surface of the base may comprise wood and/or have a wood insert having an opening extending longitudinally therethrough and configured to be situated on the support surface of the base so that the opening in the wood insert is in communication with the opening in the base and so that upon use of the mold, the wood insert contacts a frozen pop or molded treat formed within the interior mold space of the female mold body.

The base is preferably configured to sit within the interior mold space of the female mold body when the mold is assembled. The base may have a transverse cross-sectional configuration which is generally round. The base may also comprise a wall extending outwardly from the support surface so that the wall and the support surface together define a receiving area for holding a frozen pop or molded treat after using the mold.

The removable male insert mold body is preferably sized so as to extend longitudinally only partially along a length of the interior mold space within the female mold body so that upon using the mold, a frozen pop or molded treat is formed having a core space created by removal of the male insert mold body, the core space having an opening at a first end in communication with the opening in the support surface of the base and having a second closed end, wherein the core space is configured to receive and hold a second liquid and/or a solid.

The removable male insert mold body may also be, in one embodiment, an elongated pin having a head at one end thereof for pushing in or pulling out the pin through the opening in the support surface.

The base may further comprise an upper projection defining a passage therethrough, wherein the passage is configured to receive the male insert mold therethrough and the passage is in communication with the opening in the base. The upper projection may comprise a threaded exterior surface for receiving and engaging a molded treat. The base may also include a connector portion having a threaded exterior surface and the mold may also comprise a drip catcher. The drip catcher may have a radially outwardly and upwardly extending interior surface that defines an interior space and defines an opening extending longitudinally through the interior surface, and the interior surface may have mating threads around the opening that are configured to engage the threaded exterior surface of the base connector of the base, although the base could also be configured in the reverse configuration wherein the drip catcher is placed over the base and engages a threaded exterior surface on an optional upper projection so that the drip catcher could optionally sit atop the base instead of below it.

The invention also includes in one embodiment herein, a mold for a frozen pop or molded treat, comprising: a female mold body having a base surface and a wall extending outwardly from the base surface, wherein the base surface and the wall together define an interior mold space; a removable male insert mold body configured to be inserted so as to extend at least partially through the interior mold space of the female mold body and so that when the mold is used and the removable male insert mold body is removed from the female mold body, a core space is formed having an opening at a first end, a closed second end and being capable of receiving and holding a liquid and/or a solid.

The removable male insert mold body preferably has a longitudinally extending portion and a cap portion on one end of the longitudinally extending portion, the cap portion configured to mate with an edge of the wall of the female mold body on a side of the wall opposite the base surface.

The cap portion is preferably made to be detachable from the longitudinally extending portion so that in use, when the male insert mold body is removed to form the core space, the core space is filled at least partially with a liquid and/or a solid, the cap portion is detached from the longitudinally extending portion of the male insert mold body, and the cap portion can be reattached to the wall.

The base surface is preferably detachable from the wall of the female mold portion. The cap portion may also further comprise an opening therein configured to receive the longitudinally extending portion of the male insert body and after using the mold once the cap portion is reattached to the wall, a user can drink and/or eat through the opening in the cap portion.

The disclosure also includes an embodiment of a method of forming a frozen pop or a molded treat having a frozen or molded pop body and a core space inside the frozen or molded pop body having a liquid and/or a solid therein, comprising: providing a mold comprising a female mold body defining an interior mold space and having a first open end and a second end; a base having a support surface with an opening extending longitudinally therethrough, the base configured to be positioned around or within the first end of the mold body and to support by the support surface a frozen pop or a molded treat formed in the interior space of the female mold body; and a removable male insert mold body, wherein the male insert mold body is configured to be positioned within the female mold body in longitudinal alignment with the opening in the support surface of the base; providing a first liquid or a moldable solid to the interior mold space of the female mold body through the first open end thereof; positioning the base around or within the female mold, wherein the first liquid has a volume sufficient to freeze in contact to the base or the moldable solid has a volume sufficient to solidify in contact to the base; positioning the male insert body so that it passes through the opening in the base and extends at least partially along a length of the interior mold space of the female mold body; freezing the first liquid or solidifying the moldable solid in the female mold body to form a frozen pop body or a molded treat body, respectively; removing the male insert body to form the core space within the frozen pop body or the molded body treat body, respectively; and providing a second liquid and/or a solid to the core space in the frozen pop body or the molded treat body so as to be positioned within the core space through the opening in the support surface of the base.

In the method, the first liquid may be the same or different from the second liquid. At least one of the first liquid and the second liquid may also comprise an alcoholic beverage.

The base of the mold may further comprise a detachable handle configured to prevent the second liquid and/or the solid from leaking from the base, and the method further comprises attaching the handle and removing the female mold body after providing the second liquid and/or the solid to the core space. The first liquid may further comprise a solid mixed therein. The first liquid may be layered with a solid food prior to freezing.

Also within the scope of the disclosure herein is an embodiment of a frozen pop or molded treat, comprising: a frozen pop body or molded treat body formed from a first liquid or a moldable solid, respectively, the frozen pop body or the moldable solid having a first end and a second end, the frozen pop body or the molded treat body each defining a core space, the core space having a first open end and a second closed end; a second liquid and/or a solid within the core space; a base having a support surface in contact with the first end of the frozen pop body or the first end of the molded treat body and having an opening extending therethrough situated so as to be in fluid communication with the first open end of the core space; and a detachable handle configured to attach to the base and prevent leakage of the second liquid from the core space.

In this embodiment, the first liquid may be different from the second liquid. The device may further comprise a handle having a receptacle defining an interior space therein for receiving and holding the second liquid. The first liquid may also further comprise a solid.

The first liquid may be layered with a solid.

BRIEF DESCRIPTION OF THE SEVERAL VIEWS OF THE DRAWING(S)

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
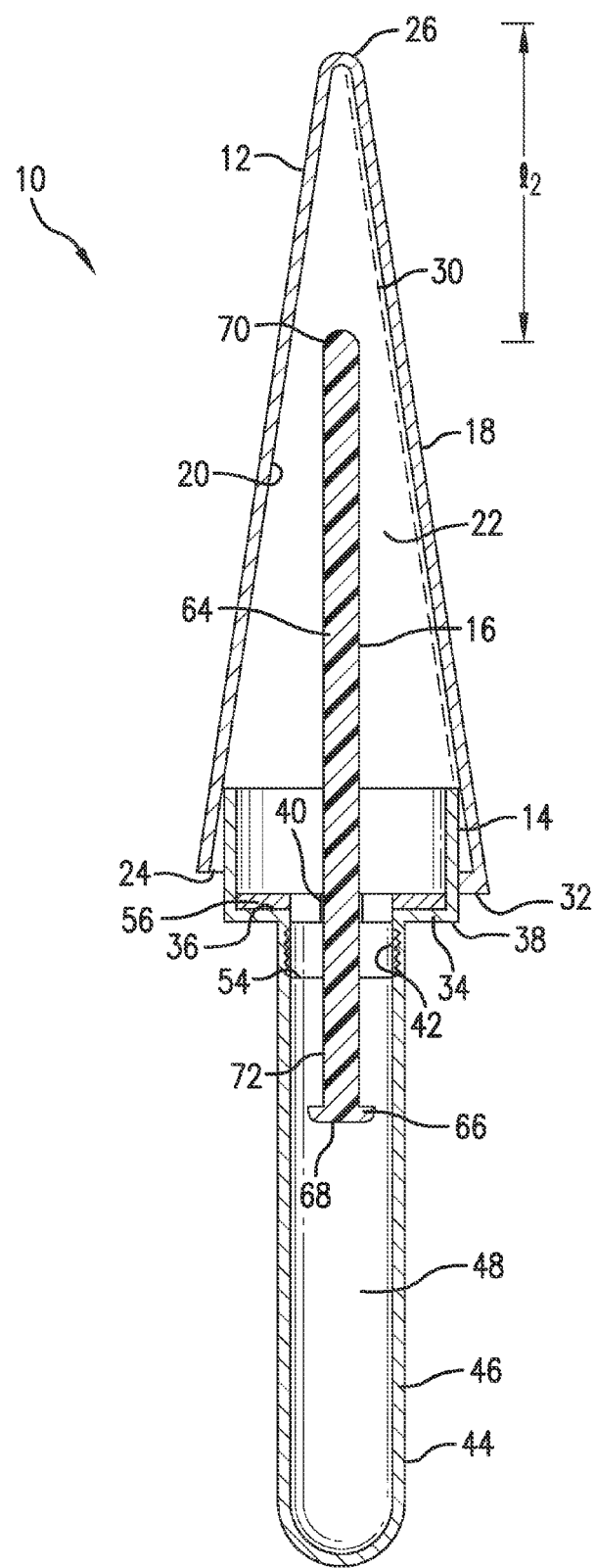
FIG. 1 is a longitudinal cross-sectional view of a mold according to an embodiment herein.

Certain terminology is used in the following description for convenience only for assistance in understanding direction in the drawings and is not intended to be limiting. The words "lower" and "upper," "right" and "left," "inner" and "outer," "outward" and "inward," and "top" and "bottom" designate directions in the drawings to which reference is made. The terminology includes the words above specifically mentioned, derivatives thereof and words of similar import.

Figure 8:
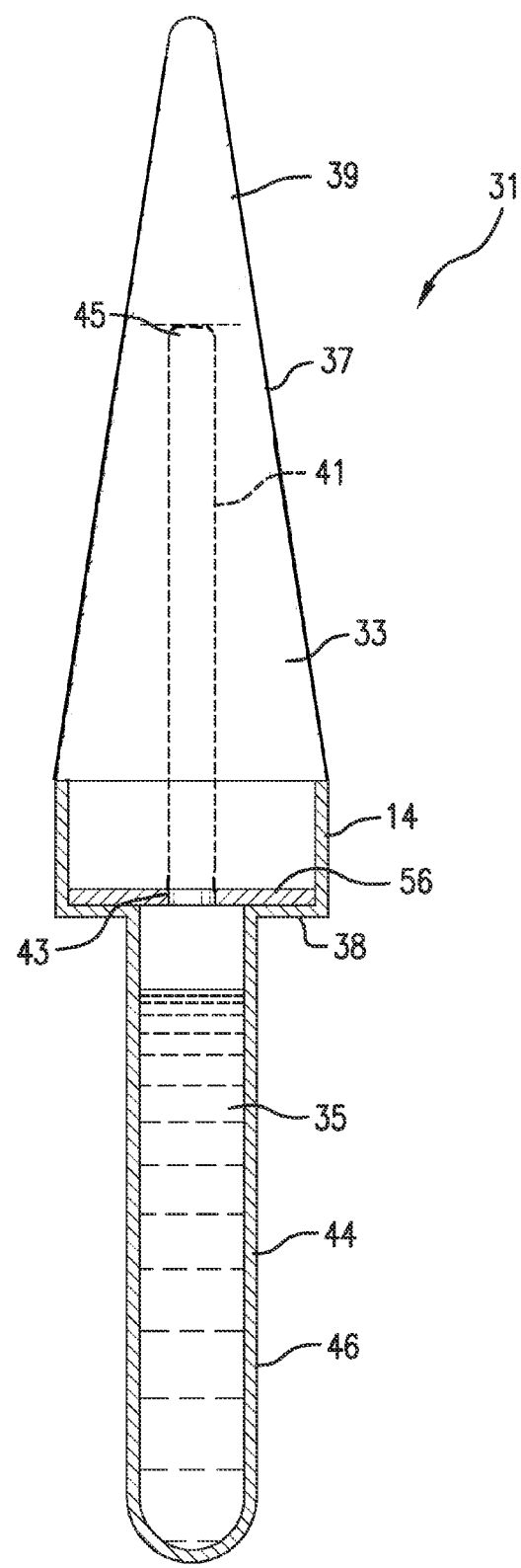
FIG. 8 is a longitudinal cross-sectional view of a frozen pop formed according to an embodiment herein.

Referring now to an embodiment of the invention as shown in FIGS. 1-6, an embodiment of a mold as described herein is shown along with an example of a frozen treat formed from the mold shown in FIG. 8. The mold is for forming a frozen pop. As used herein, "frozen pop," means any ice treat or other edible product shaped from freezing a liquid, such as a beverage, whether alcoholic or non-alcoholic. Such treats are also referred to as "popsicles," however, such term is a well-known trademark for frozen ice treats on a stick. As used herein, "cake pop" is intended to mean any solid formed bake good positioned on the handle of the mold and/or engaging its base, such as a cake material, a brownie material and the like. A "molded treat" as used herein can be any food, snack, treat, or other edible item formed by molding whether by a frozen mold, heat molding by baking, microwaving or setting, and the like and should encompass all molds made herein unless otherwise specified to be different.

Figure 2:
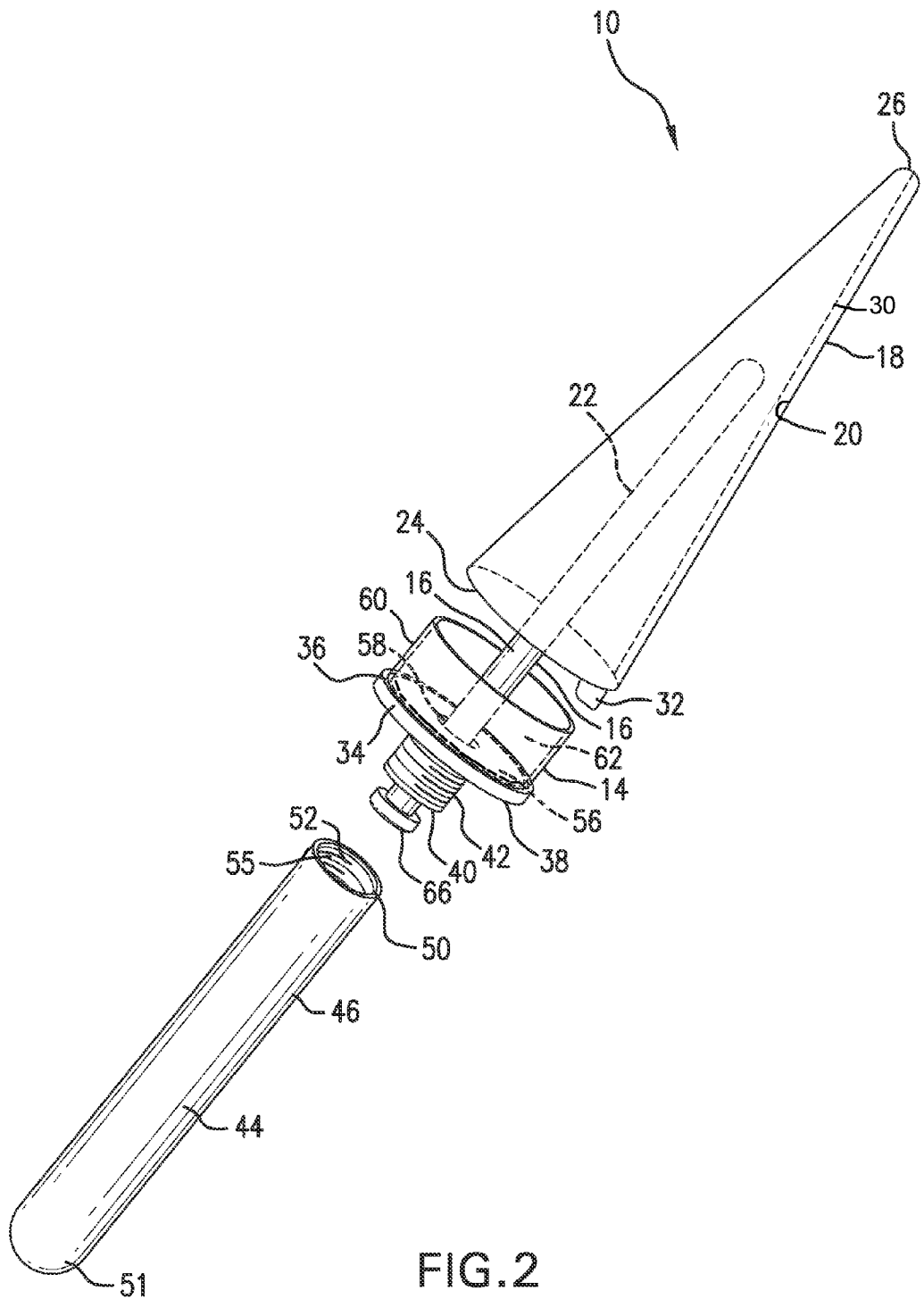
FIG. 2 is a perspective, exploded view of the mold according to the embodiment of FIG. 1.

The mold for forming a frozen pop, generally referred to herein as mold 10, is shown in FIG. 1 and has a female mold body 12, a base 14 and a removable male insert mold body 16. The female mold body 12 has an exterior surface 18 and an interior surface 20. The female mold body also defines an interior mold space 22. The mold space 22 is shaped and preferably conforms to the interior surface 20 of the female mold body 12. The mold space 22 has a first open end 24 and a second end 26. As shown, the first open end 24 is seated over the base 14. The female mold body open end may be configured so as to fit and be positioned within the base or over and/or around the base depending on the desired mold design, but as shown and preferred herein, the open end of the mold body fits over and around the base. As shown in FIG. 2, the open end 24 is in communication with the mold space 22 and can receive a liquid to be frozen or a moldable solid to be formed. As used herein, a "liquid" for forming a frozen pop is any liquid that can solidify to form a frozen solid when subjected to a decrease in temperature. A "moldable solid" includes fully solid materials that are sufficiently moldable to be shaped when pushed into a container, semi-solid or thick or viscous liquids that can be shaped and solidify (either through heat, cold or compression) and liquid materials that can be heated (instead of frozen) to form a molded solid (e.g., liquid cake or other batter that upon baking or microwaving forms a molded solid or molded treat (cake, brownie, etc.) in situ.

Liquids that may be frozen include but are not limited to water, a flavored beverage, an alcoholic beverage, a flavored alcoholic beverage, and/or pre-mixed or mixed drinks (martinis, daiquiris, mojitos, cosmopolitans, sangria, liqueurs, wine, beer and many others without meaning to be limiting). Typical non-alcoholic beverages include juice, water, flavored water, enhanced water and juices such as fitness water/juices, children's drinks (Hawaiian Punch®, Kool Aid®, etc.), carbonated and non-carbonated/flat sodas, seltzer or carbonated water, iced tea, lemonade, sports drinks (Gatorade® varieties), slushies, milk shakes, and various combinations of drinks. Any drink which may be frozen alone or when in combination with another liquid or solid may be used as a first liquid to be frozen herein. In addition, it is within the scope of the invention that candy, food, flavor crystals, whip cream, fudge, sprinkles, fruit, etc. can be frozen mixed in the liquid or layered with the frozen liquid (e.g., as is presently done in frozen fruit bars) or for an enhanced dessert experience.

The female mold body is preferably closed at its second end 26 so as to receive a liquid for freezing or a moldable solid, etc. within the interior mold space 22 of the female mold body 12. When being used to form a frozen pop, e.g., the mold end 26 would be positioned so as to face downwardly in order to retain the liquid and prevent spillage. Reference to a frozen pop is made to illustrate the invention herein, but is not intended to be limiting as the scope of the disclosure also includes moldable solids as explained elsewhere herein. In a preferred embodiment, approximately 0.1 to about 5 ounces of a first liquid, and preferably about 2 to about 4 ounces, and more preferably about 3 ounces of liquid are used for forming a frozen pop body. As shown, the female mold body example herein is of a conical shape having the tip of the cone at second end 26 and the base of the cone at open end 24. It should be understood according to this disclosure, however, that the shape of the female mold body is not limited and may be of a variety of configurations, including generally rectangular, square, oval, elliptical, rounded corner rectangular or square configurations, spherical, "rocket"-shaped, shot glass shaped, or shaped for marketing purposes as a trademarked shape, a shape appealing to a child user, a shape of a character, etc.

Figure 3:
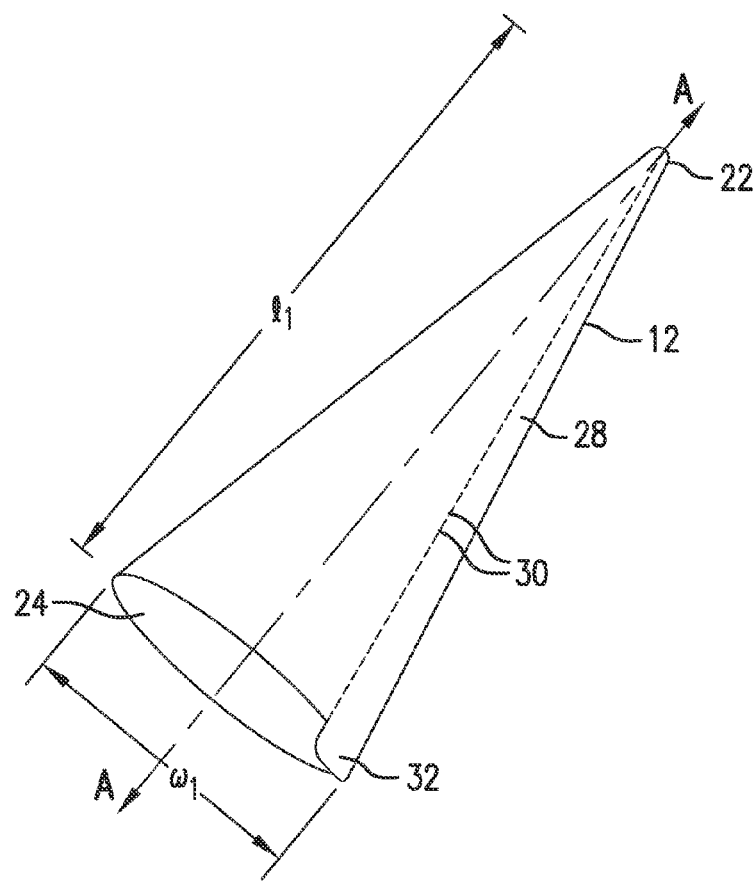
FIG. 3 is a perspective view of a female mold body for use in the embodiment of FIG. 1.

For ease of manufacturing, the conical shape is being exemplified as it enables the mold former to use existing products, such as paper cones known in the industry for supporting ice cream cones and the like, for quick and easy assembly, with a removable and disposable mold. Such a mold can be formed of a disposable material such as plastic or recyclable polymeric materials. In one preferred embodiment, herein the female mold body is formed of a frangible material such that it can be torn. It is also possible to form the female mold body of a frangible material that is made to be frangible by providing perforations for easy tearing and removal of the female mold body after using the mold to form a frozen pop within the interior mold space of the female mold body. Thus, once the frozen pop forms, the user can simply remove the female mold body by tearing, and if appropriate, dispose of the torn female mold body. An example of a perforated frangible female mold body 12 is shown in FIG. 3 wherein a perforated strip 28 having perforations 30 and a pull tab 32 is illustrated. Alternatively, instead of a perforation, a pull-apart overlapped cone that separates at the overlap by a frangible adhesive or simply a frangible material that easily tears without a perforation may be used as well.

The female mold body 12 may also be formed of one or more polymer material(s), elastomeric materials, tearable or non-tearable paper materials, cardboard materials, foil materials and combinations and laminates thereof. Non-frangible materials may be used for situations, such as home or restaurant use, wherein a user may want to re-use the same female mold. Frangible materials, such as perforated paper and the like would be more likely to be useful in commercial or industrial manufacturing for economical and easy assembly suitable to mass production and disposable use.

The female mold body 12 as shown has a length $l_1$ as shown in FIG. 3 measured longitudinally along a central axis A-A of about 3 in. to about 10 in., preferably about 4 in. to about 8 in. and most preferably about 5 in. to about 6 in. The female mold body 12, in the example shown, $w_1$ measured transversely across the first open end or in the longest transverse dimension measured perpendicularly across the female mold body, of about 0.5 in. to about 2 in. It is preferred that the female mold body 12 is sufficiently long to accommodate the male insert body while leaving a length $l_2$ as shown in FIG. 1 that leaves a frozen solid top portion of a frozen pop when the mold is used. The length $l_2$ may be varied depending on preference. In use, the female mold body 12 is positioned upside down from what is shown in FIG. 1 to hold and freeze a first liquid or solidify a moldable solid therein around the male insert mold 16. When the frozen pop or molded treat is formed and removed from the female mold body 12, it is then positioned upright in the direction in which the mold is situated and shown in FIG. 1 such that the portion of the frozen pop or molded treat formed in the female mold body in length $l_2$ is on the top of the frozen pop or molded treat. The user can eat the top part of the frozen pop or molded treat, to expose the open area of the pop or treat for drinking a second liquid or eating a second solid through the open area of the pop or treat.

The base 14 has a support surface 34 having a lower face 38 and an upper face 36. The base has an opening 40 extending longitudinally therethrough. The opening enables a male mold insert body 16 to fit within the mold when in use, and to be removed when the frozen pop is formed to create an interior space for receiving a second liquid. The base 14 is configured to be positioned so as to fit around or within the first end 24 of the female mold body 12 and to support by way of the support surface 34 a frozen pop or molded treat formed in the interior space 22 of the female mold body 12. When the frozen pop or molded treat is formed, and the female mold body is removed, the solid frozen pop or molded treat sits atop the upper face 36 of the support surface 34. Preferably, the base is about 1 in. to about 4 in. wide, and preferably about 1.25 in. to about 2 in. wide. If walls are provided, it is also preferably about 0.25 in. to about 1.5 in. in longitudinal height, and preferably about 0.25 to about 0.5 in. in height. In a further embodiment, it is within the scope of the invention that the base may be slightly enlarged in width to accommodate overflow liquid from melting of a frozen pop and/or formed so as to include a lip or holding ridge to capture melting liquid for keeping user's hands and clothing clean.

In the embodiment shown, a removable male insert mold body 16 is provided and may be of various shapes, but is preferably configured so as to fit through the opening 40 in the support surface 34 in the base 14 in general longitudinal alignment. By "general longitudinal alignment" it is intended that the male insert mold body 16 is preferably fully or substantially aligned with the opening, however, some movement or variability in the alignment may be off from substantial or perfect alignment due to the nature of the mold material, the size of the insert and any flexibility or angle desired in the finished molded product with respect to the handle. The male insert mold body may fit snugly or have space around it as shown, however, it should be able to easily slide into and remain centrally located in a generally upright or longitudinal position. Thus, the insert should fit by sliding into the opening 40. The insert mold body is preferably wide enough to fit within the opening, but not so wide that it fits too snugly to be removed by a user when the frozen pop is complete and the user needs to remove the male insert mold body to form the internal cavity in the frozen pop.

In the preferred embodiment shown, the base 14 includes a base connector piece 42. The connector piece 42 in the base 14 is preferably configured to work with a handle 44. The handle 44 may have a variety of configurations, but is preferably attachable, detachable and re-attachable by way of a connector that mates with the base connector piece 42. Such a connector piece may be a threaded end, a snap fit end, a friction fit end, a quick connect end, and the like and is not intended to be limited herein. Preferably, the handle 44 is a receptacle 46 in that it is solid but defines an interior space 48 configured to hold liquid. The receptacle 46 handle preferably has a first end 50 having an opening 52 therein. As shown, the opening is as wide as the first end 50 of the receptacle, however, the opening 52 may be formed so as to be smaller than the end 50 of the receptacle such as a forced opening through a top surface.

The receptacle also has a receptacle connector piece 54 which should be configured so as to mate with the base connector piece 42 for connecting the base 14 to the receptacle 46. When assembled, the receptacle as shown locks by mating connections, which as shown are threads 55. The threads tighten to hold the receptacle to the base. The connector may be sized differently than or the same as the opening in the base, however, preferably the base connector is sized to mate with and conform with the receptacle connector. If mating threads are used, the connectors 42, 54 may be of the 0.25 in. to about 0.75 in., preferably about 0.5 in. It will be understood to one skilled in the art, based on this disclosure, that a wide variety of fastening connection methods may be used, mating threads being preferred, but snap fit, friction fit, connectors and the like may also be employed within the scope of and without departing from the spirit of the invention.

After the frozen pop or molded treat is formed, the receptacle can be detached if desired to introduce into the interior space 48 of the receptacle a second liquid, which may be the same or different than the first liquid or moldable solid. Thus, any of the liquids or moldable solids noted above may be used. In addition, the second liquid can be a solid food product or a combination of liquid and solid food products. For example, as noted above, the first liquid may have foods mixed into the liquid or layered therein. For the second liquid, however, a solid food may be substituted altogether. For example, within a frozen pop body, a user may fill the core of the frozen pop through the receptacle or through another filling source, with fruit, candies and other flavored smaller food items or cut-up pieces, e.g., but not limited to, M&Ms®, Skittles®, PopRocks®, Nerds®, chocolate chips, sprinkles/jimmies, marshmallows, gummy bears, candy bar pieces, fudge, birthday cake, cookie dough and the like (which may also be included within the first liquid in the female mold forming the frozen pop). Such materials or any others noted herein may be added with or without liquid to the core space with or in place of a second liquid through a receptacle with the idea of introducing a new flavor combination. Likewise, a molded treat such as a cake pop or brownie pop may be formed with a core of a liquid filling, viscous material or candies, etc. as noted above.

Examples of new flavor combinations could include a raspberry flavored vodka frozen pop body with lemon-flavored candy center, a frozen orange juice pop with a vodka core, a frozen strawberry daiquiri pop with a gummy bear core, a key lime flavored martini frozen pop with a lime liqueur core, etc. The user, restaurant, bar, etc. can thus be creative and use the molds to make a large variety of flavored treat and drink combinations. Home use is also contemplated wherein interesting drink combinations can be formed for adults (alcoholic and non-alcoholic) for home entertaining and the like, or fun drink combinations can be made for children as well.

The liquid can be independently filled by the end user, or the user can purchase the mold, with pre-filled detachable receptacles. Preferably, a receptacle handle is capable of retaining up to about 1 to 3 ounces of liquid, preferably about 0.5 to about 1.5 ounce of liquid for providing a taste or flavor of liquid through the frozen pop. In one embodiment as shown the receptacle is about 4 to about 6 in. in length measured longitudinally and about 0.25 to about 0.75 in. in transverse width. Thus the receptacle can be configured appropriately. However, it should be understood that the receptacle can hold more or less than this amount if desired.

Preferably, the receptacle connector piece 54 and the base connector piece 42 are releasably connectable to each other for installing and removing the receptacle.

The support surface may be formed of a variety of materials, such as molded polymeric materials, including composites thereof, and other food-grade approved surfaces such as wood, e.g., the materials issued for making frozen pop sticks.

A wood insert 56 (also formed of a food-grade material) may also be provided to the base 14. The wood insert should have an opening 58 extending longitudinally therethrough preferably in line with the opening 40 in the base 14. The wood insert 56 is preferably configured as a disc (or other shape conforming to the base) to be situated on the support surface 34, on an upper face 36 thereof, on the base 14. Thus, the opening 58 in the wood insert 56 is situated so as to be in fluid communication with the opening 40 in the base 14. Upon use of the mold, the wood insert 56 contacts a frozen pop formed within the interior mold space of the female mold body. This enables a manufacturer to use a sturdy and renewable base formed of a variety of materials having varied properties, but to provide a reinforcing, food grade wood insert to contact the frozen pop. The wood insert may be about 0.005 to about 0.15 in. in diameter in a preferred embodiment in thickness as measured longitudinally.

As described above, it is preferred that the base is configured to sit within the interior mold space 22 of the female mold body 12 when the mold is assembled. It may also be configured so that the base sits around the female mold body if desired.

The base preferably has a transverse cross-sectional configuration which is generally round, but can be changed in shape to accommodate various preferred designs, characters, rocket-shaped base, etc.

The base preferably includes an upwardly and/or outwardly extending wall 60. As shown, the wall extends outwardly from the support surface 34 so as to extend directly upwardly. However, the wall could lean outwardly as well so as to be more "dish-like". The wall 60 and the support surface 34 together define a receiving area 62 for holding a frozen pop after using the mold. Thus, the wall acts to hold the bottom portion of a frozen pop with enhanced stability. It should be understood, however, that a wall may be omitted in certain embodiments and/or shaped differently than as shown. Further, if provided, the wall 60 should conform along a perimeter edge thereof to the shape of the base support surface 34. The wall may be formed of a variety of materials as can the support surface. As shown, the wall and support surface are a single unitary piece formed of a molded thermoplastic, such as food grade polyethylene, cardboard, silicone, and various similar materials, including food grade wood, laminated food packaging materials and the like. The wall and the support surface of the base may also be separate and moveable with respect to each other (e.g., forming the wall as a slidable retaining ring shaped to slide up and around the base support surface with a conforming shape) or a single formed item, but frangible so that the wall can be, e.g., connected by a perforated edge to the base for easily removing the wall after formation of a frozen pop.

Figure 4:
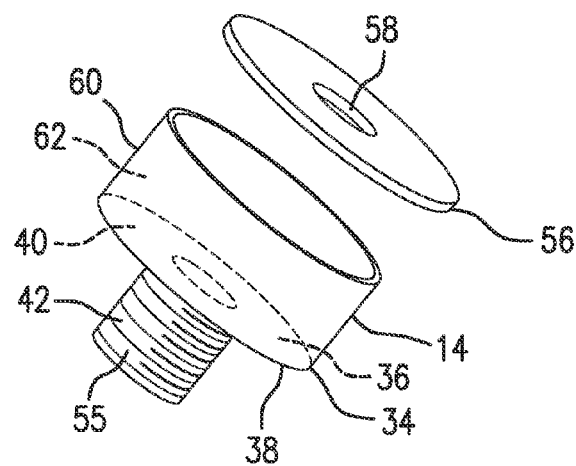
FIG. 4 is a perspective, exploded view of a base having a wood insert for use in the embodiment of FIG. 1.
Figure 5:
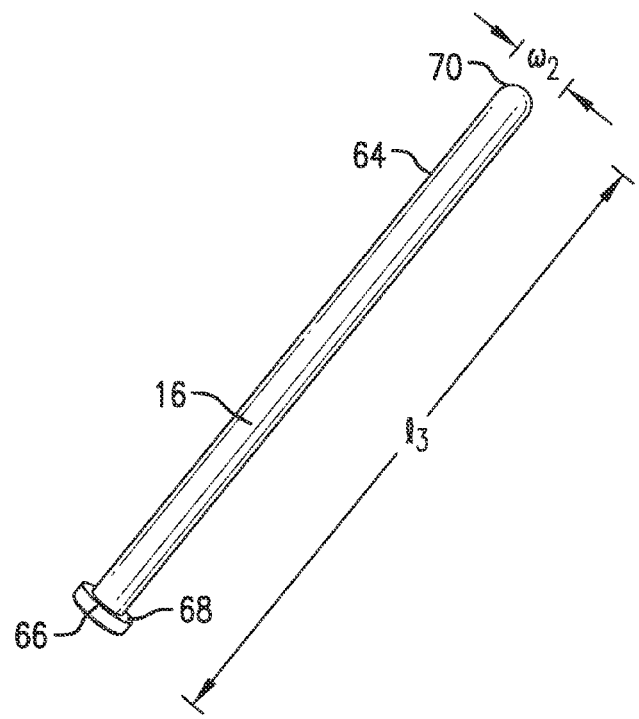
FIG. 5 is a perspective view of a removable male insert mold body for use in the embodiment of FIG. 1.
Figure 6:
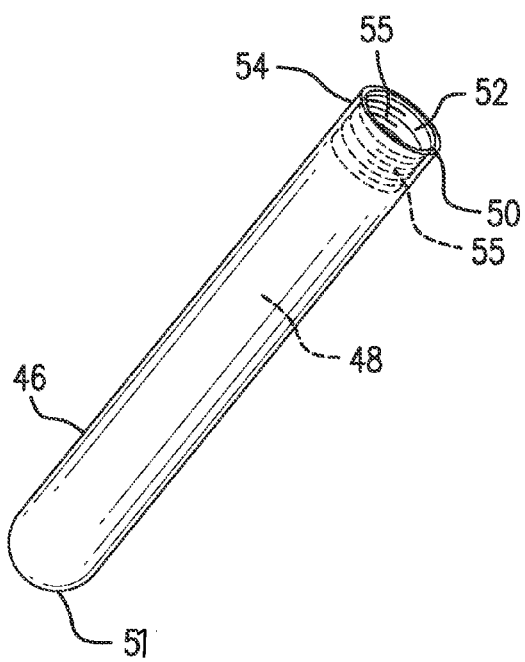
FIG. 6 is a perspective view of a handle formed as a receptacle for use in the mold embodiment of FIG. 1.

The removable male insert mold body 16 is sized in length $l_3$ so as to extend longitudinally only partially along the length $l_1$ of the female mold body 12 in the interior mold space 22 thereof. Upon using the mold, as noted above, a frozen pop or molded treat will be formed having a core space created by removal of the male insert mold body 16. The core space will have an opening at one end of the space in communication with the opening 40 in the support surface 34 of the base 14, and if used, in communication with the opening 58 in any insert 56 as shown in FIG. 4. The core space created by removing the male insert mold body 16 would have a closed second end. Thus, the core space would be configured to receive and hold a liquid which can be introduced through the openings 40 and/or 58, and if an open receptacle handle is used, through the interior space 48 of the receptacle 46 through the opening 52 in the first end 50 thereof.

The removable male insert mold body as shown and in the present embodiment has an elongated body piece 64, a head or gripping end 66 on one end 68 thereof and a length $l_3$ as noted above. Such a head is optional in other embodiments. The length of the male insert mold body is preferably sized to leave a suitable length $l_2$ between the insert end 70 of the male insert mold body and the end 26 of the female mold body 12 of about 0.5 in. to about 4 inch, and more preferably about 1 in. to about 2 in., however, it should be understood based on this disclosure that the length $l_2$ may be varied by preference depending on the shape of the mold and the amount of solid frozen pop desired at the top eating end for a given design configuration. The overall length $l_3$ of the male insert mold body 16 can be extended to provide additional length to enhance the length of the portion that extends out of the base 14 when the male insert mold is positioned within the female mold body. The portion 72 of the male insert mold body 16 having the head or gripping end 66 thereon that extends out of the opening 40 in the base 14 when in use to form a frozen pop, can have a varied length. It should be long enough for a user to grip and slide the male inert mold 16 in and out of the opening 40 in the base, but that length balanced against keeping the size of the piece and attendant cost minimized as well as to keep the overall size of the mold 10 reasonable for storage purposes in use in a freezer. Preferably the overall length $l_3$ of the male insert mold body is about 2 in. to about 9 in., more preferably about 3 in. to about 6 in., and most preferably about 3 in. to about 5 in.

The width $w_2$ of the male insert mold body 16 measured transversely across the center of the body portion 64 thereof is sized and configured to provide the shape of an inner core space in a frozen pop formed by the mold. In the embodiment shown, the core space formed would be a narrow, elongated core through the longitudinal center of the frozen pop or molded treat, extending partially through the pop or treat, so as to receive a liquid beverage or other filler therein. The shape could be changed depending on desired design, however, it should be understood based on this disclosure that the frozen pop or molded treat needs enough solid formed around the core space through which a liquid beverage or other filler may be received to retain its structural integrity and not too readily collapse while being eaten.

The male insert mold body is preferably formed of a material which does not stick to or bond to a frozen liquid or moldable solid when the frozen pop body or molded treat is formed and which retains its structural integrity throughout the filling and freezing process. Suitable materials includes metals and alloys (such as aluminum, stainless steel, etc.) and certain polymers, such as silicone, hard molded plastics acceptable for food grade use such as certain types of olefins, styrenics and carbonates as well as food grade wood or cardboard.

As illustrated in the drawings, the removable male insert mold body 16 is shown as an elongated pin for a body 64 and a head 66 at one end 68 thereof, wherein the head can be used for pushing in or pulling out the pin body 64 through the opening 40 in the support surface 34 of the base 14. The head as shown is generally flat for ease of manufacture, although round, square or other aesthetic designs may be used to provide a pulling and pushing function. In addition, if an open receptacle such as receptacle 46 is employed, the head 66 is preferably sized so as to fit within the interior space 48 of the receptacle as shown in FIG. 1. In a preferred embodiment the head is about 0.25 in. to about 0.75 in., and more preferably about 0.5 in. Even though the male insert mold body 16 will be removed after use, for assembly when placed in a freezer for formation of the pop, it may be desirable to place the handle (or receptacle as shown) on the base using the connectors 42, 54. However, this is optional and the handle can be aesthetically configured for marketing or user appeal purposes.

Figure 7:
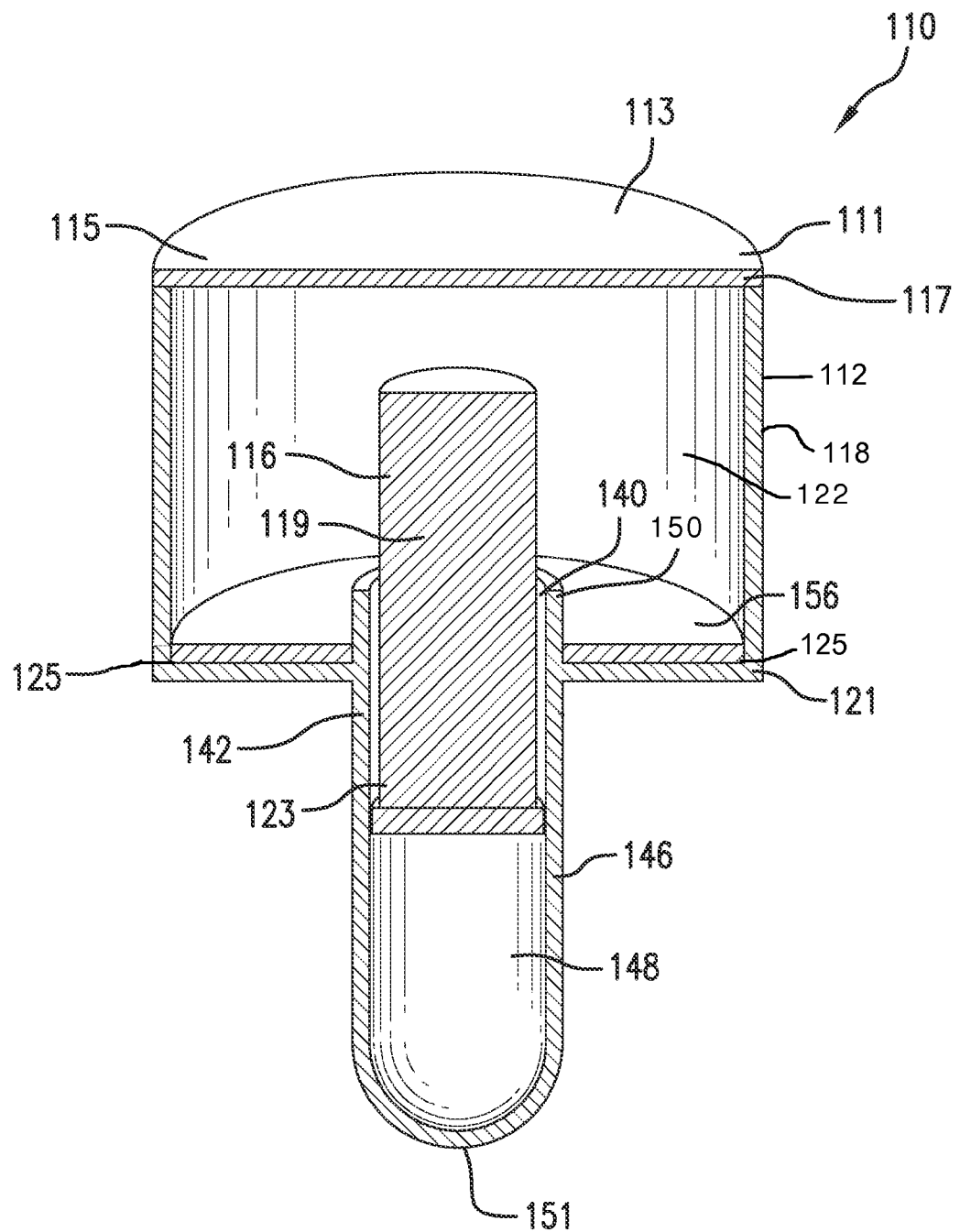
FIG. 7 is a longitudinal cross-sectional view of a mold according to a further embodiment.

An alternative mold for a frozen pop is also encompassed herein, which is more of a drinkable dessert cup configuration. With reference to FIG. 7, a mold 110 is shown having a female mold body 112 shaped more in a small cup or dessert cup configuration, although the size may vary. The mold 110 has a base surface 111. The female mold body 112 has an outer wall 113 which has an exterior surface 118 sized for such a use extending outwardly from an upper flat surface 113. The flat surface 113 and the wall 118 together define an interior mold space 122. The wall 118 and base 113 may be formed as a unitary body or as separate detachable pieces, the latter being preferred as a lid feature can be provided by making a flat surface which can be part of the mold body but double as a lid 115 and a connecting lip 117 (or similar feature for attaching a lid to a cup) can be provided. The lid 115 can be the bottom of the cup mold when filled with liquid for freezing, and then can be removed for eating the frozen solid material within the mold after forming a frozen pop within the mold. The lid and/or mold can be formed of a permanent material so as to be reuseable or formed of frangible materials in the manner used in small ice cream dessert cups.

A removable male insert mold body 116 is configured to be inserted at least partially longitudinally into the interior space 122 of the female mold body 112. The length can be adjusted as noted above to provide for a variety of cup-type or dessert cup molds and/or to leave a varying amount of solid frozen top or solid molded treat over liquid or filler when the frozen pop or molded treat is made and the mold inverted for eating. The male insert mold body 116 is formed so as to extend at least partially through the interior mold space 122 of the female mold body. When the mold is used and the removable male insert mold body is removed from the interior mold space 122 of the female mold body 112, a core space is formed as noted above that has an opening at a first end, a closed second end and being capable of receiving and holding a liquid. The core space takes the shape of the removed male insert mold body 116.

In one embodiment as shown, the removable male insert mold body 116 has a longitudinally extending portion 119 that may have a handle (not shown) or be formed with a cap portion 121 as an additional support surface as shown in FIG. 7. The cap 121 potion is over one end 123 of the longitudinally extending portion 119 of the male insert mold body 116 by end 151 of the cap portion 121 and, is preferably configured to mate with an edge 125 of the wall 118 of the female mold body 112 on the side of the wall 118 opposite the flat surface 113 which, as noted above, may be unitary with the wall or a removable lid 113. The male insert portion 116 may have is solid removable body portion 146 that can be unitary with or detachable from a cap portion 121 at cap portion end 142. The removable body portion 146 of the male insert mold may also be formed so as to be open on end 150 for introduction of a liquid which may be either the same or different form the liquid used to form a solid frozen dessert within the female mold portion. The cap portion 121 acting as a support surface can have an opening 140 therethrough for introducing the longitudinally extending, portion 119, if not attached, and/or for introducing liquid either through the. opening 140 or through an attachable and detachable receptacle feature such as that shown in Fig. 1 with respect to the embodiment shown therein which can receive liguid in an interior space and may have a wood insert 156 as with Fig 1.

The cap portion 121 as a support surface may be formed so as to be detachable from the longitudinally extending portion so that in use, when the male insert mold body is removed to form the core space, the core space may be filled at least partially with a liquid, and the cap portion can be detached from the longitudinally extending portion of the male insert mold body, and the cap portion can be reattached to the wall. However, in use, a cap or cap portion should be reattached once the core space is filled at least partially or fully with liquid or other filler, to form a lower snap-on cap such as a cover lid or snap in space where the male insert mold is removed.

The cap portion 121 of the base support 111 preferably also includes an opening 140 therein configured to receive the long longitudinally extending portion 119 of the male insert body 116 into space 148 and after using the mold 110, once the cap portion 121 is reattached to the wall, a user can introduce liquid or filler, then close the opening 140 by using a flat and solid, but removal cap portion or by providing a separate insert plug (not shown) the place inside and seal the opening. In use, after making a frozen solid treat inside the mold 110, the flat surface/lid 115 is on the bottom of the structure and the mold is filled with a liquid such as a flavored beverage. The male insert mold portion, by way of the longitudinally extending portion 119 is positioned inside the mold space 122 (either before or after introducing the liquid). The cap portion can then be placed over the mold as well (and would be automatically if attached to the longitudinally extending portion).

After freezing, the male insert mold is removed, including both the cap portion and the longitudinally extending portion to leave a core space. The core space may be filled with liquid. The core space can be filled by an attachable or non-attachable receptacle (as shown in the FIG. 1 embodiment). The opening then is preferably closed by an attachable receptacle that allows liquid to flow into the core space, or more preferably by a replaceable cap such as an additional lid that fits over the cap or a cap portion having a plug or insert. In yet a further embodiment, the lid 115 can be pulled off the top of the frozen solid or molded treat portion and placed over as a support surface or in place of additional support surface 121. The solid top portion that is open is then eaten to reveal a solid portion having a core space filled with a liquid for drinking. In a dessert cup embodiment, it is also possible that instead of a liquid such as a beverage that a flavored cream, ice cream, whipped cream or the like is introduced in the core space.

With reference to the embodiment of FIGS. 1-6, and FIG. 8, a method of forming a frozen pop or molded treat is now described herein. The frozen pop or molded treat to be formed is shown in FIG. 8, in an example generally referred to as frozen pop 31 which is used herein for illustration purposes. The frozen pop 31 has a frozen pop body 33 and a core space 41 inside the frozen pop body 33. However, it will be understood, based on this disclosure, that a similarly formed molded treat may also be formed using this method and having the same configuration but formed of different materials. After formation, the frozen pop 31 preferably has a liquid 35 in the receptacle handle as shown, or if a solid handle is used, the liquid may be within the core space 41. A solid filler may also be provided. In the method to form the frozen pop, a mold is provided, which may be any of the embodiments described herein, including a mold such as mold 10 having a female mold body 12 defining an interior mold space 22 and having a first open end 24 and a second end 26. The mold preferably also has a base 14 which has a support surface 34. The support surface of the base may have an opening 40 extending longitudinally therethrough as described hereinabove in further detail. The base is preferably configured to sit on or within the first end of the frozen pop mold and to support by the support surface a frozen pop formed in the interior space of the female mold body.

The mold preferably also includes a removable male insert mold body such as mold body 16 as described above which is preferably configured to fit through the opening 40 in the support surface in the base 14. In the preferred method, a first liquid that forms frozen pop body 33 is provide to the interior mold space 22 of the female mold body 12 through the first end 24 thereof.

The base 14 is positioned on or within the female mold 12, and preferably within the mold so as to retain the liquid and keep out contaminants. The first liquid is preferably added in a volume sufficient so that when it freezes, it will contact the support surface of the base 14.

The male insert body is positioned such that it passes through the opening in the base and extends at least partially along a length of the interior mold space of the female mold body. The first liquid is then frozen in the female mold body to form the frozen pop body 33. The male insert body 16 is then removed after freezing to form the core space 41 within the frozen pop body 33. A second liquid 35 or solid filler, which can be the same or different from the first liquid that forms the frozen pop body 33, is then available for introduction into the core space in the frozen pop body 33 through the opening 40 in the base 14. At least one of the first liquid and the second liquid may be an alcoholic beverage for providing unique flavor experiences. However, both liquids may be non-alcoholic as well for everyday use or for providing an attractive drink alternative to children.

If the base 14 of the mold further includes a detachable handle, it is preferred that the handle is configured to prevent the second liquid from leaking from the base. If so, then in the method, the handle may be attached to the female mold body to introduce the liquid to the core space and left on or detached after drinking the liquid. The handle, or as shown in FIG. 8, a receptacle, can be attached by way of the base for providing the second liquid 35 to the core space, for example by attaching and detaching a base connector piece and a receptacle connector piece. If using a receptacle, the second liquid 35 may be provided through the interior space 48 of the receptacle.

The frozen pop is preferably positioned so that the second liquid from the receptacle is able to flow from the interior space 48 of the receptacle to the core space 41 of the frozen pop 31. The female mold body is then removed for eating the frozen pop. If formed of a frangible material, the female mold body can be simply torn, for example, along a perforation. In use, the user eating the frozen pop 31 eats the top solid portion 39 of the frozen pop 31, exposing the inside of the core 41. Liquid from the handle or another source can then be introduced into the core 41 and drank through the frozen pop so as to combine these flavors. The ice pop body can also absorb some of the liquid from the receptacle to provide a unique flavor combination. Similarly, a molded treat such as a cake cup can absorb some of a liquified filler for a multi-textural dessert experience.

The invention also includes the frozen pop or molded treat as described above and as shown as an example of a frozen pop in FIG. 8. In addition to liquids, dessert applications, combination drinks and the like, other uses can be conceived of from the present invention, including formation of a frozen drink treat through which children can take medication if otherwise not amenable to do so because of the taste of the medicine.

A further alternative embodiment of the invention as shown in FIGS. 9-21, wherein like elements have like reference numbers throughout. The mold in this embodiment, mold 1010 is shown in assembled form in FIG. 9 with a liquid in the handle thereof for illustration purposes, it being understood that a solid filler may also be within the receptacle as discussed with embodiment 10 and 110. The mold may form frozen pops or molded treats such as those shown in FIG. 8 but using a slightly different mold design. The differences are highlighted herein, and where not otherwise mentioned, would be the same as in prior embodiment 10. The mold 1010 has a female mold body 1012, a base 1014 and a removable male insert mold body 1016. The female mold body 1012 has an exterior surface 1018 and an interior surface 1020 (see FIGS. 9, 20 and 21). The female mold body also defines an interior mold space 1022. The mold space 1022 is shaped and preferably conforms to the interior surface 1020 of the female mold body 1012. The mold space 1022 has a first open end 1024 and a second end 1026. As shown, the first open end 1024 is seated over the base 1014. The female mold body open end may be configured so as to fit and be positioned within the base or over and/or around the base depending on the desired mold design, but as shown and preferred herein, the open end of the mold body fits over and around the base.

Figure 9:
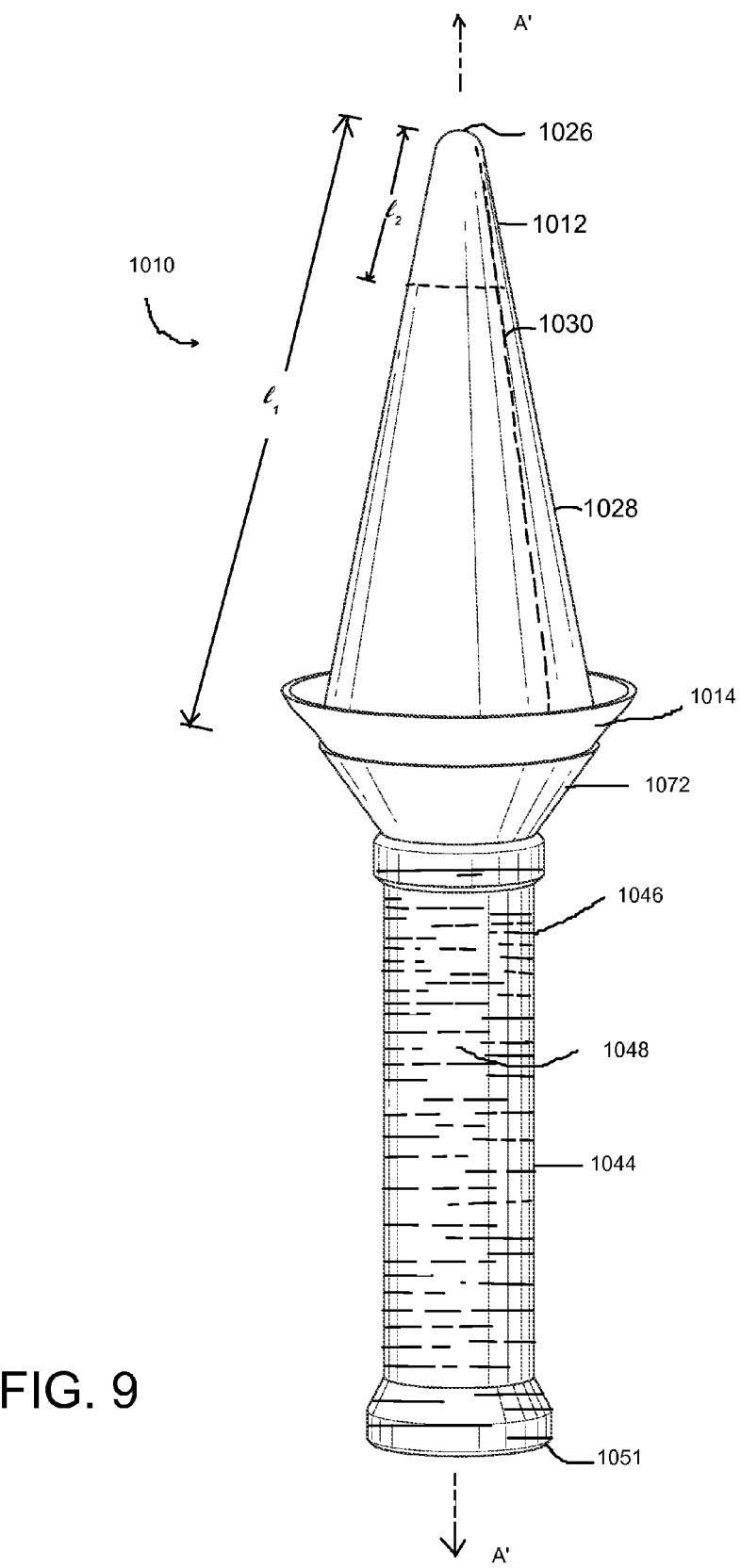
FIG. 9 is a front elevational view of a further embodiment of a mold according to the disclosure having a liquid incorporated in the handle.
Figure 10:
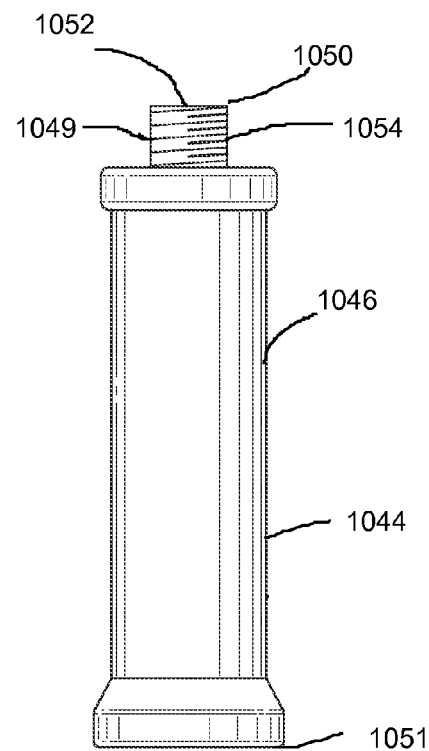
FIG. 10 is a front elevational view of the handle for use in the mold shown in the embodiment of FIG. 9.
Figure 11:
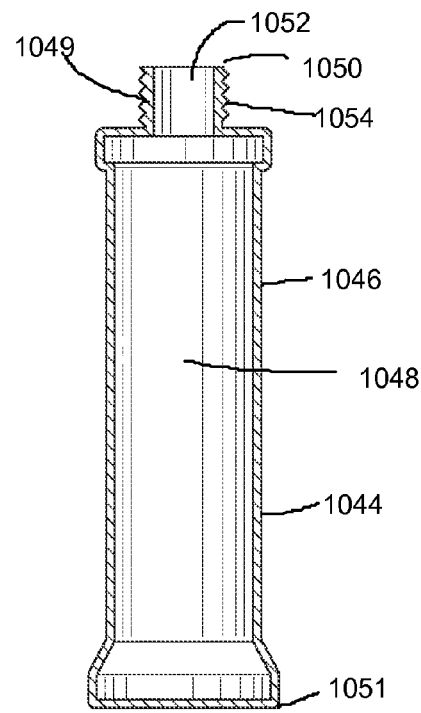
FIG. 11 is a longitudinal cross-sectional view of the handle of FIG. 10.
Figure 12:
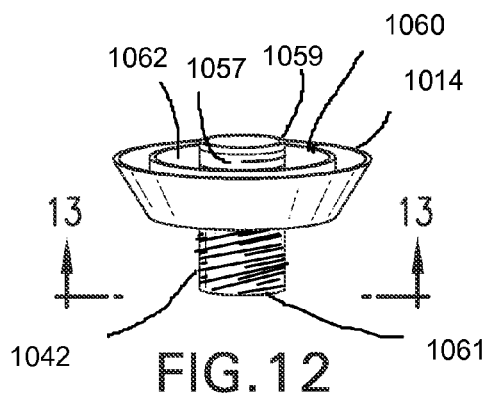
FIG. 12 is a perspective view of a mold base for use in the embodiment of FIG. 9.
Figure 13:
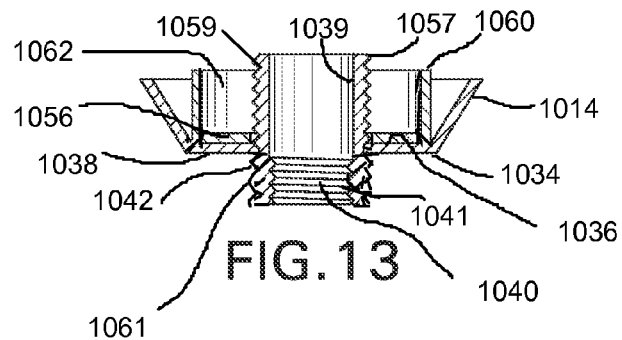
FIG. 13 is a longitudinal cross-sectional view of the base of FIG. 12.
Figure 14:
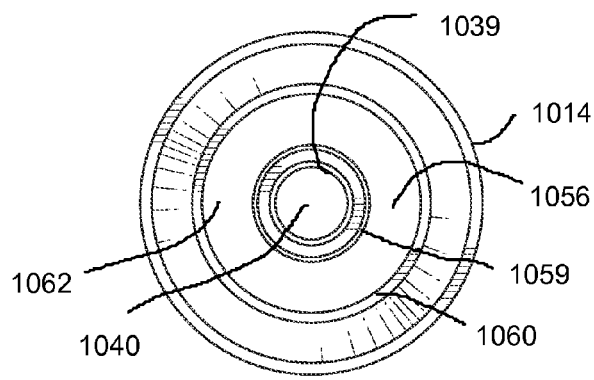
FIG. 14 is a top plan view of the base of FIG. 12.
Figure 15:
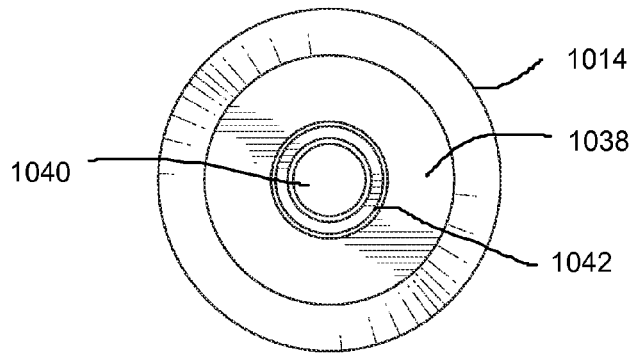
FIG. 15 is a bottom plan view of the base of FIG. 12.
Figure 16:
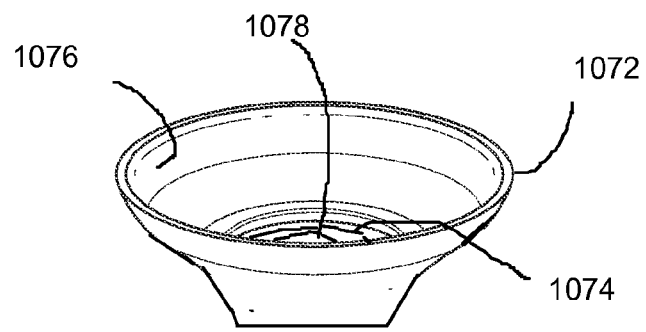
FIG. 16 is a perspective view of an optional drip catching insert for use in the embodiment of FIG. 9.
Figure 17:
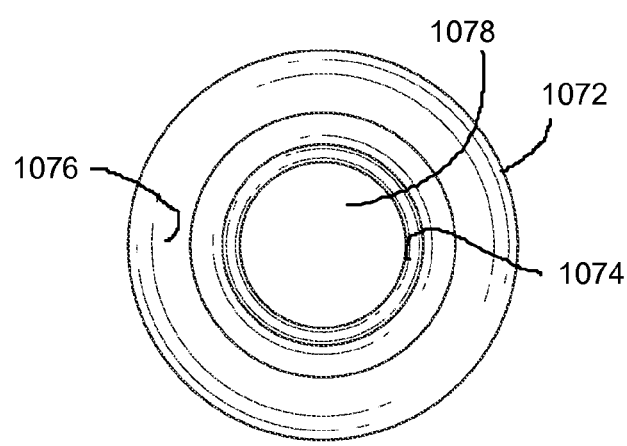
FIG. 17 is a top plan view of the drip catching insert of FIG. 16.
Figure 18:
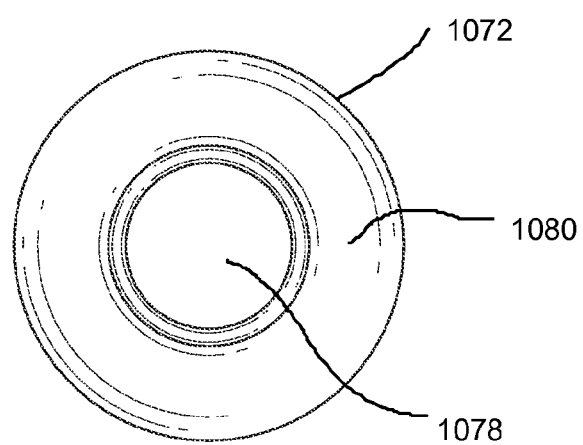
FIG. 18 is a bottom plan view of the drip catching insert of FIG. 16.
Figure 19A:
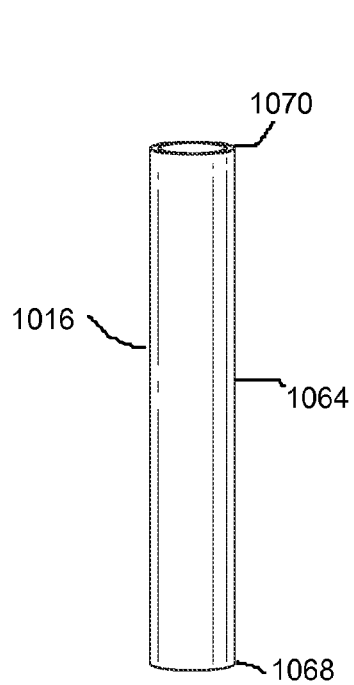
FIG. 19A is a front elevational view of an alternative male insert mold body for use in the embodiment of FIG. 9.
Figure 21:
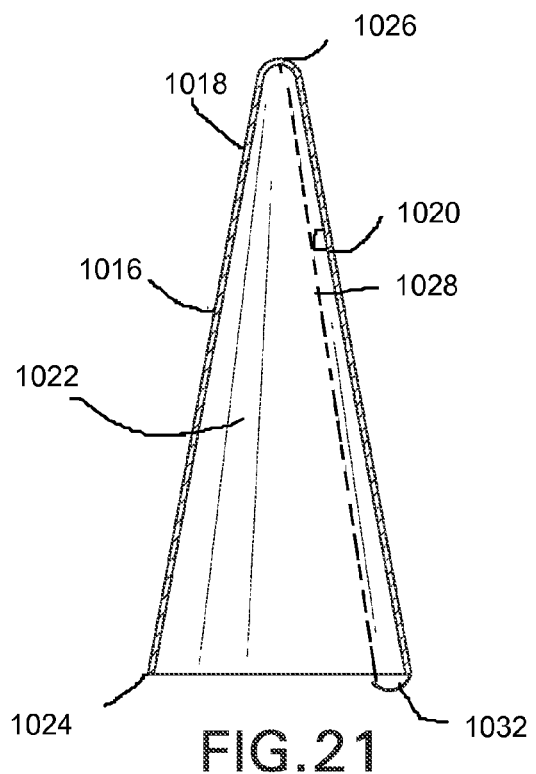
FIG. 21 is a longitudinal cross-sectional view of the female mold body for use in the embodiment of FIG. 9.
Figure 19B:
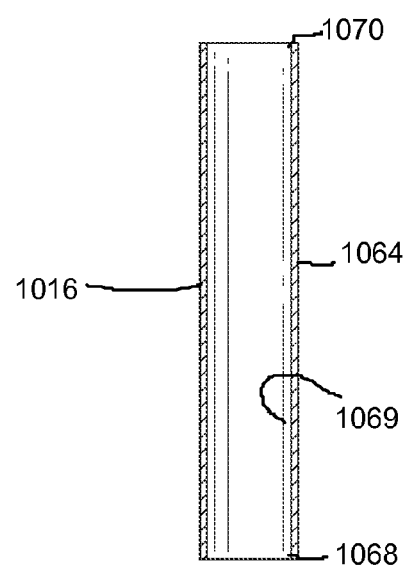
FIG. 19B is a longitudinal cross-sectional view of the male insert mold body of FIG. 19A.
Figure 20:
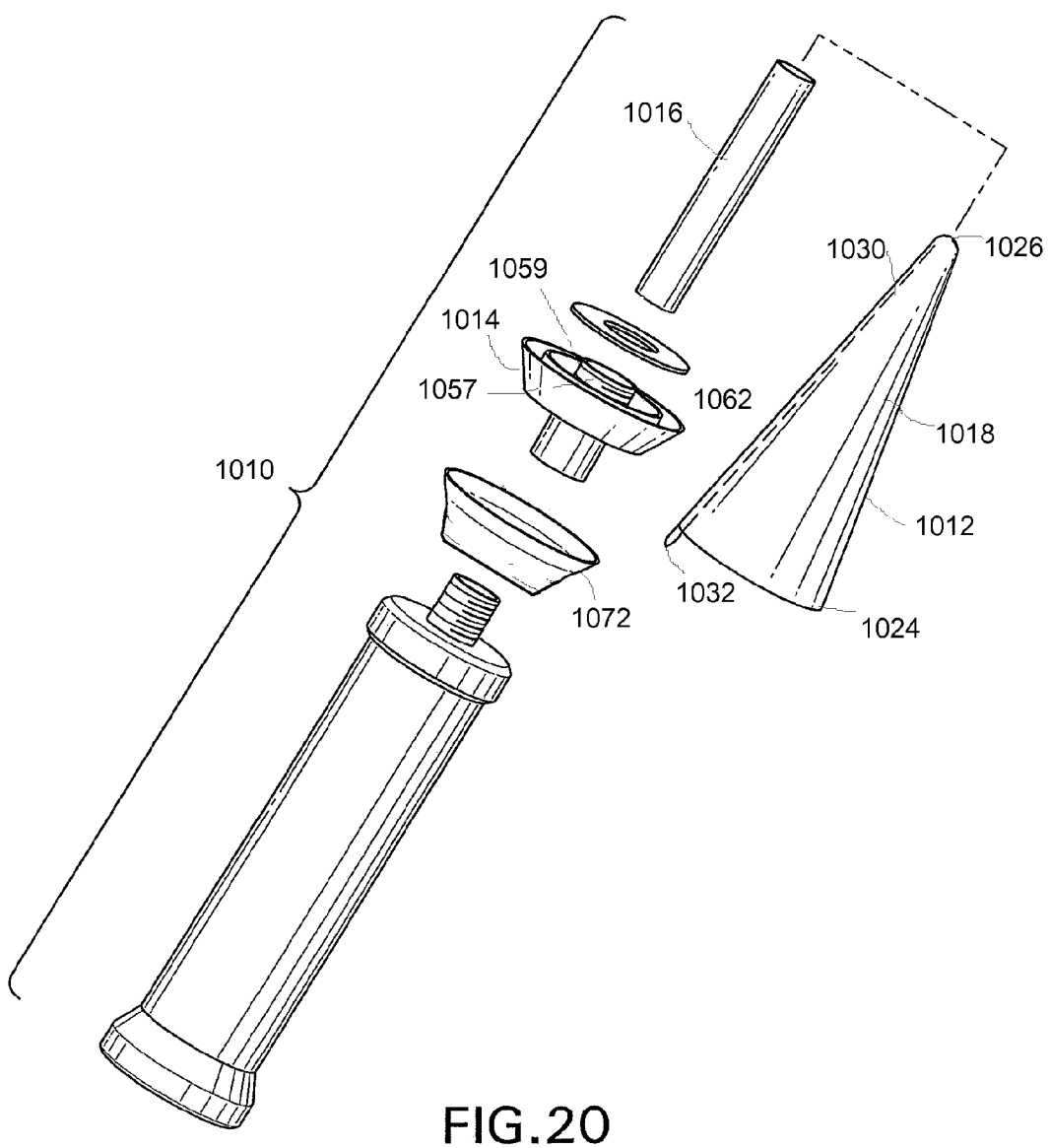
FIG. 20 is expanded perspective view of the embodiment of FIG. 9.

As shown in FIGS. 9, 20-21, the open end 1024 is in communication with the mold space 1022 and can receive a liquid to be frozen or a moldable solid to be formed. The liquids and/or solids used as the same as described above with respect to embodiments 10, 110.

The female mold body 1012 is preferably closed at its second end 1026 so as to receive a liquid for freezing or a moldable solid, etc. within the interior mold space 1022 of the female mold body 1012. When being used to form a frozen pop, e.g., the mold end 1026 would be positioned so as to face downwardly in order to retain the liquid and prevent spillage. The shape and size and dimensions may be varied as discussed above with respect to embodiment 10 and may be formed of the same materials noted above. As shown, it is formed of a frangible, perforated material as an illustration. Once the frozen pop or molded treat forms, the user can simply remove the female mold body by tearing, and if appropriate, dispose of the torn female mold body. An example of a perforated frangible female mold body 1012 is shown in FIGS. 9 and 20-21, wherein a perforated strip 1028 having perforations 1030 and a pull tab 1032 is illustrated. Alternatively, instead of a perforation, a pull-apart overlapped cone that separates at the overlap by a frangible adhesive or simply a frangible material that easily tears without a perforation may be used as well.

The female mold body 1012 as shown has a length $l_1$ as shown in FIG. 9 measured longitudinally along a central axis A'-A' and a width, $w_1$ measured transversely across the first open end or in the longest transverse dimension measured perpendicularly across the female mold body as described above with respect to embodiment 10. It is preferred that the female mold body 1012 is sufficiently long to accommodate the male insert body while leaving a length $l_2$ as shown in FIG. 9 that leaves a frozen solid or molded treat solid top portion of a frozen pop or molded treat, respectively when the mold is used. As with embodiment 10, the length $l_2$ in embodiment 1012 may be varied depending on preference. In use, the female mold body 1012 is positioned upside down from what is shown in FIG. 9 to hold and freeze a first liquid or solidify a moldable solid therein around the male insert mold 1016. When the frozen pop or molded treat is formed and removed from the female mold body 1012, it is then positioned upright in the direction in which the mold is situated and shown in FIG. 9 such that the portion of the frozen pop or molded treat formed in the female mold body in length $l_2$ is on the top of the frozen pop or molded treat. The user can eat the top part of the frozen pop or molded treat, to expose the open area of the pop or treat for drinking a second liquid or eating a second solid through the open area of the pop or treat.

The base 1014 has a support surface 1034 having a lower face 1038 and an upper face 36. The base has an opening 1040 extending longitudinally therethrough. The opening enables a male mold insert body 1016 to fit within the mold when in use, and to be removed when the frozen pop or molded treat is formed to create an interior space for receiving a second liquid. The base 1014 is configured to be positioned so as to fit around or within the first end 1024 of the female mold body 1012 and to support by way of the support surface 1034 a frozen pop or molded treat formed in the interior space 1022 of the female mold body 1012. When the frozen pop or molded treat is formed, and the female mold body is removed, the solid frozen pop or molded treat sits atop the upper face 1036 of the support surface 1034. The base may have general dimensions in height and width as noted above with respect to embodiment 10.

The base has an optional upper projection 1059 having a threaded exterior surface 1057. The upper projection has a passage in communication with and that is part of the opening 1040 in the base. The interior surface 1039 of the upper projection 1059 may be configured to receive and hold upright the male insert mold 1016. As shown, male insert mold 1016 should be able to fit through the opening 1040 and extend slightly outside the lower base connector piece 1042. This extension helps align the male insert mold 1016. Further, the threaded exterior surface 1057 (which is optional) may be used with an optional drip catcher 1072.

The drip catcher 1072 (see FIGS. 9, 16-18 and 20) has a fanned-out or dished appearance as shown, but may also have a more directly upwardly and perpendicularly extending wall if desired. The drip catcher as shown has an interior surface 1076 which is curved downwardly and may pan out as shown slightly flatter at the bottom to hold liquid that drips from a frozen pop, for example, when in use. The drip catcher interior surface 1076 defines an opening 1078 extending longitudinally therethrough that may, for example, have mating threads 1074 configured to engage the threaded exterior surface 1057 of the upper projection 1059 of the base 1014. While threaded surfaces or shown, friction fit, snap fit or gnurled surfaces, stops and similar mechanisms may also be used to seat the drip catcher. The opening 1078 is configured to fit around and contact and preferably engage, such as by mating threads, the exterior surface 1057 of the upper projection 1059 of the base 1014. This feature is optional and can be separate from or an integral and unitary extension of the base as described above with reference to embodiment 10. The lower surface 1080 preferably bends upwards and radially outward to support the drip catching upper interior surface 1076 when the user is eating a frozen pop formed from the mold 1010.

The male insert mold body 1016 should still be able to easily slide into and remain centrally located in a generally upright or longitudinal position and aligned when extending through the opening 1040 in the base 1014. The male insert mold body 1016 shown in this embodiment does not have a head as in embodiment 10, and is hollow instead of solid. However, it should be understood that these are a variation and that the male insert body 1016 can also be made to be solid and/or have a head.

The base 1014 includes a base connector piece 1042. The connector piece 1042 in the base 1014 is preferably configured to work with handle 1044. Handle 1044 as with handle 44 in embodiment 10 may have a variety of configurations, but is preferably attachable, detachable and re-attachable by way of a connector that mates with the base connector piece 1042. Such a connector piece may be a threaded end, a snap fit end, a friction fit end, a quick connect end, and the like and is not intended to be limited herein. In the present embodiment, the handle 1044 is also a receptacle 1046 in that it is solid but defines an interior space 1048 configured to hold liquid or a solid filler as with embodiment 10. The receptacle 1046 handle preferably has a first end 1050 having an opening 1052 therein. As shown, the opening is as wide as the first end 1050 of the receptacle, however, the opening 52 may be formed so as to be smaller than the end 1050 of the receptacle such as a forced opening through a top surface.

The receptacle also has a receptacle connector piece 1054 which should preferably be configured so as to mate with the base connector piece 1042 for connecting the base 1014 to the receptacle 1046. When assembled, the receptacle as shown locks by mating connections, which as shown are threads 1049. Unlike embodiment 10, however embodiment 1010 illustrates use of external threads 1049 on the connector piece 1054 of the receptacle 1046 which mate with threads 1041 on the interior surface 1039 of the base in the area of the base connector piece 1042. The threads tighten to hold the receptacle to the base. It will be understood to one skilled in the art, based on this disclosure, that a wide variety of fastening connection methods may be used, mating threads being preferred, but snap fit, friction fit, connectors and the like may also be employed within the scope of and without departing from the spirit of the invention.

After the frozen pop or molded treat is formed, the receptacle can be detached if desired to introduce into the interior space 1048 of the receptacle a second liquid or a solid filler, which may be the same or different than the first liquid or moldable solid. Thus, any of the liquids or moldable solids noted above may be used. In addition, the second liquid can be a solid food product or a combination of liquid and solid food products. For example, as noted above, the first liquid may have foods mixed into the liquid or layered therein. For the second liquid, however, a solid food may be substituted altogether. Any of those liquids or solids mentioned above may be used.

Preferably, the receptacle connector piece 1054 and the base connector piece 1042 are releasably connectable to each other for installing and removing the receptacle.

The support surface may be formed of a variety of materials, such as molded polymeric materials, including composites thereof, and other food-grade approved surfaces such as wood, e.g., the materials issued for making frozen pop sticks. As with embodiment 10, a wood insert 1056 (also formed of a food-grade material) may also be provided to the base 1014. The wood insert should have an opening 1058 extending longitudinally therethrough preferably in line with the opening 1040 in the base 1014. The wood insert 1056 is preferably configured as a disc (or other shape conforming to the base) to be situated on the support surface 1034, on an upper face 1036 thereof, on the base 1014. Thus, the opening 1058 in the wood insert 1056 is situated so as to be in fluid communication with the opening 1040 in the base 1014. Upon use of the mold, the wood insert 1056 contacts a frozen pop or molded treat formed within the interior mold space of the female mold body.

As described above, it is preferred that the base is configured to sit within the interior mold space 1022 of the female mold body 1012 when the mold is assembled. It may also be configured so that the base sits around the female mold body if desired.

The base 1014 preferably includes an upwardly and/or outwardly extending wall 1060. As shown, the wall extends outwardly from the support surface 1034 so as to extend directly upwardly. However, the wall could lean outwardly as well so as to be more "dish-like". The wall 1060 and the support surface 1034 together define a receiving area 1062 for holding a frozen pop or molded treat after using the mold. Thus, the wall acts to hold the bottom portion of a frozen pop or treat with enhanced stability. It should be understood, however, that a wall may be omitted in certain embodiments and/or shaped differently than as shown. Further, if provided, the wall 1060 should conform along a perimeter edge thereof to the shape of the base support surface 1034. The wall may be formed of a variety of materials as can the support surface. As shown, the wall and support surface are a single unitary piece formed of a molded thermoplastic, such as food grade polyethylene, cardboard, silicone, and various similar materials, including food grade wood, laminated food packaging materials and the like. The wall and the support surface of the base may also be separate and moveable with respect to each other (e.g., forming the wall as a slidable retaining ring shaped to slide up and around the base support surface with a conforming shape) or a single formed item, but frangible so that the wall can be, e.g., connected by a perforated edge to the base for easily removing the wall after formation of a frozen pop.

The removable male insert mold body as shown and in the present embodiment has an elongated body piece 1064, a first end 1068 and an insert end 1070 and preferably has dimensions consistent with those noted above for male insert 16 in embodiment 10, with the exception that it may have a blunt insert end as shown, omit a head if desired and also be hollow as shown or solid. The size may be varied by preference depending on the shape of the mold and the amount of solid frozen pop or molded treat desired at the top eating end for a given design configuration and taking into account the factors noted above with respect to embodiment 10. The male insert mold body is preferably formed of a material such a those noted above and which does not stick to or bond to a frozen liquid or moldable solid when the frozen pop body or molded treat is formed and retains its structural integrity throughout the filling and freezing process.

As illustrated in the drawings, the removable male insert mold body 1016 is shown as an elongated pin for a body 1064 and end 1068 can be pushed in or pulled out through the opening 1040 in the support surface 1034 of the base 1014. The head as shown is generally flat and blunt, although round, square or other aesthetic designs may be used to provide a pulling and pushing function. In addition, if an open receptacle such as receptacle 1046 is employed, the end 1068 is preferably sized so as to fit within the interior space 1048 of the receptacle as with embodiment 10 although without the optional head.

Figure 22:
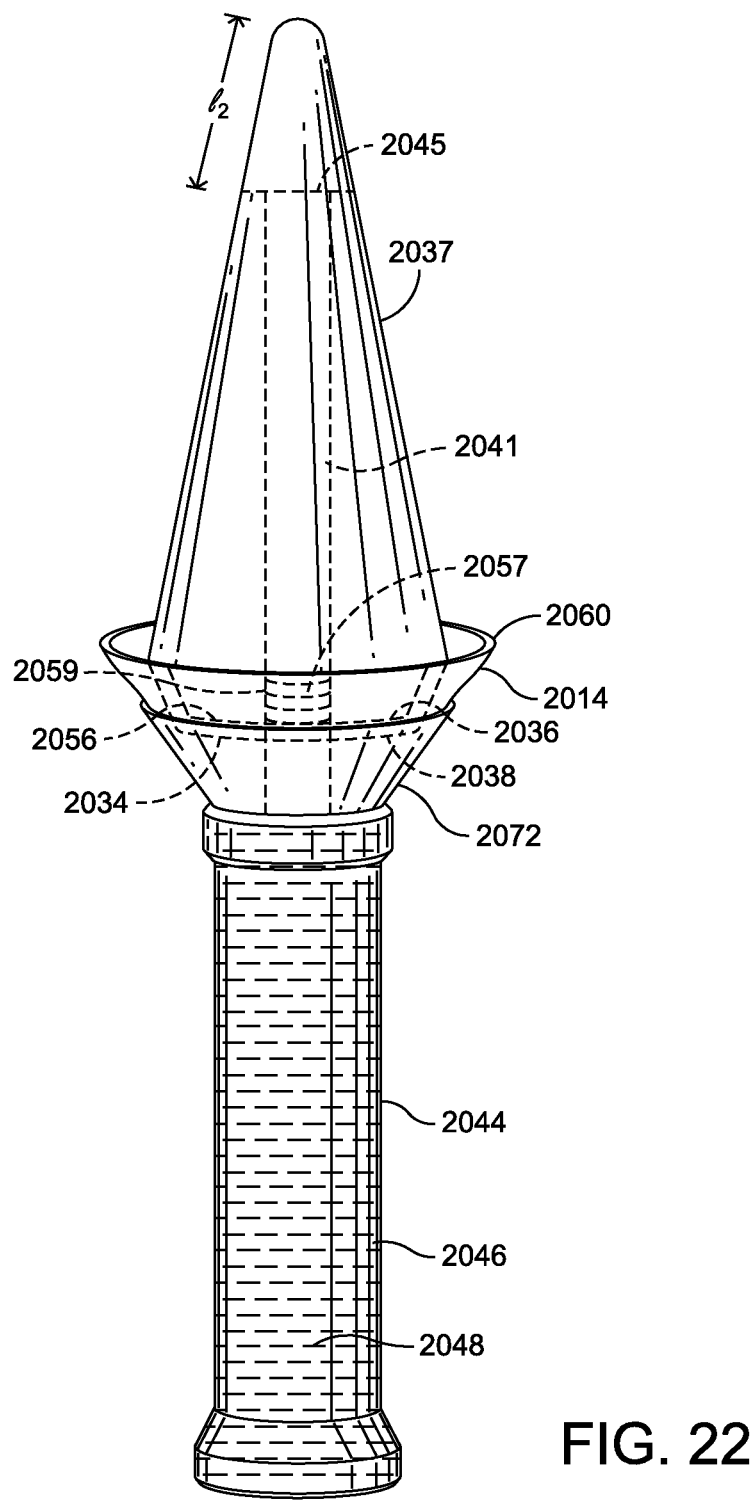
FIG. 22 is a front elevational view of a cake pop formed according to a further embodiment of a mold herein having the male mold body removed and liquid in the handle.
Figure 23:
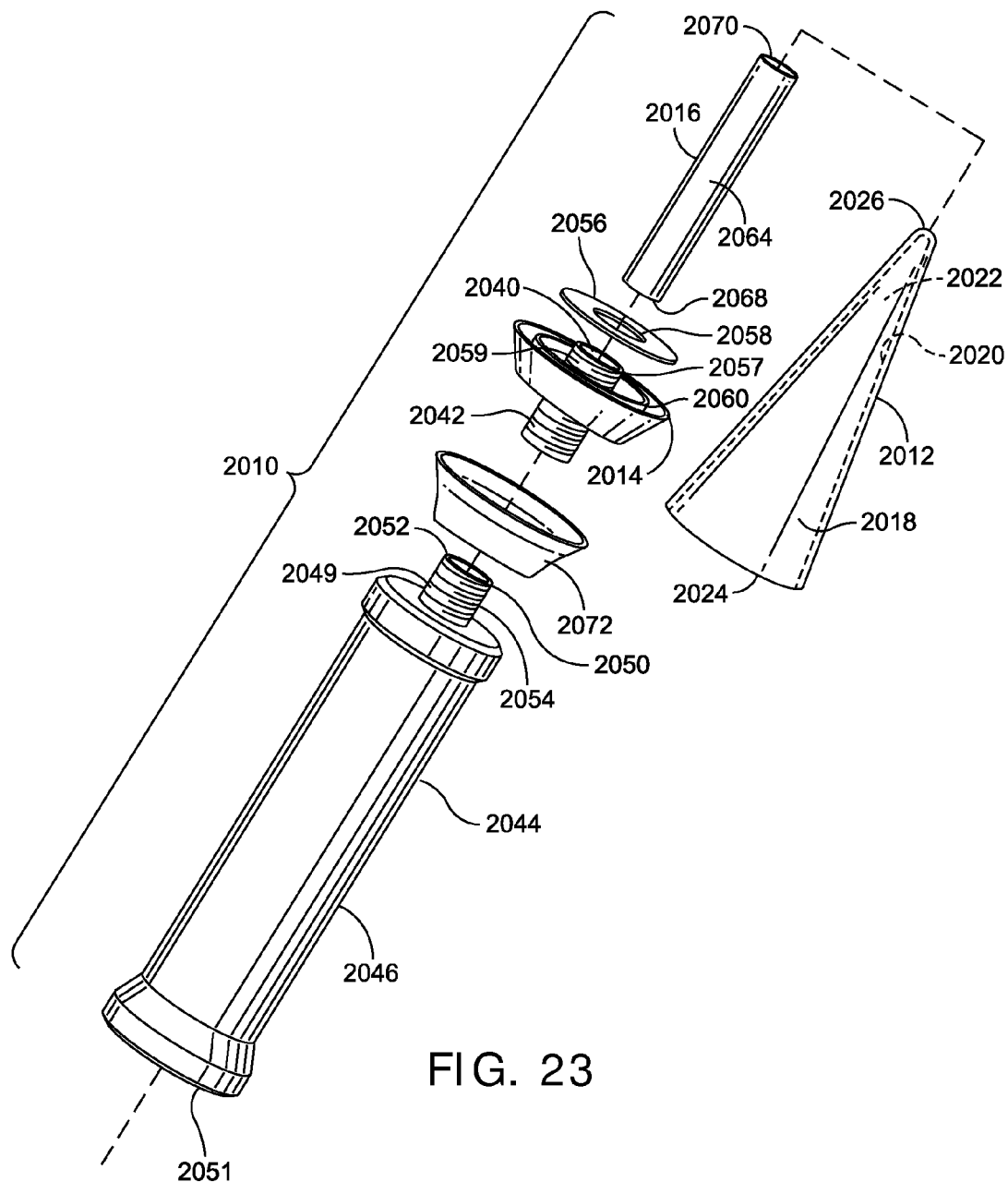
FIG. 23 is an expanded perspective view of the embodiment of the mold used for forming the cake pop of FIG. 22.

A further alternative embodiment of the invention which is a further variant of the embodiment of FIGS. 9-21 is shown in FIGS. 22-23, wherein like elements have like reference numbers throughout. The mold in this embodiment, mold 2010 is shown having its parts in an expanded view in FIG. 23. FIG. 22 shows a cake pop formed using the mold of FIG. 23 assembled, but the female mold body, which is optional in this embodiment, is removed. As shown, liquid is in the handle for illustration purposes, it being understood that a solid filler may also be within the receptacle as discussed with respect to embodiments 10, 110 and 1010. While a frozen treat may be formed using the embodiment 2010, it is also easy to use to make solid treats as described with respect to FIGS. 22-23. The primary components of the handle and the base are the same as those in embodiment 1010, and may be varied in the same manner as those components as described above. In this embodiment, if a cake pop or other solid confection is being formed, a drip catcher can be used if included for versatility of use (i.e., to also make frozen meltable treats), but is also optional when solid treats are formed that do not leak or present dripping issues. Other differences of the embodiment 2010 are highlighted herein, and where not otherwise mentioned, the components and respective description would be the same as described above for embodiments 10 and 1010.

The mold 2010 has a female mold body 2012, a base 2014 and a removable male insert mold body 2016. The female mold body 2012 has an exterior surface 2018 and an interior surface 2020 (see FIG. 23). The female mold body also defines an interior mold space 2022. The mold space 2022 is shaped and preferably conforms to the interior surface 2020 of the female mold body 2012. The mold space 2022 has a first open end 2024 and a second end 2026. As shown, the first open end 2024 is configured so that it would seat over the base 2014. The female mold body 2012 can be separate from the overall mold 2010 as assembled or part of the overall assembly. The mold is preferably made of a heat-resistant substance if forming a cake or other baked confection. It is also contemplated that confections that merely harden without baking could be made, in which case the material may be more varied (as described above with respect to the other embodiments). If freezing is contemplated, materials suitable for low temperature may be used. All female mold body materials are preferably suitable for contact with food (food grade). Baking mold materials may include a silicone, metal, tempered glass and the like. In an mold such as mold 2010 as with other embodiments, it is within the scope of the invention also to provide the handle and base portion of the assembly as a separate but interchangeable element with various female mold bodies, so that various pop shapes may be formed. For examples, multiple molds of different materials for different uses (baking, freezing, etc.) with the same or different shapes may be provided in a kit with one or more compatible handles and base components to form multiple confections. Such materials may be sold independently or in kit form. Further, trays, mixing tools, instructions, and other accessories (food or drink packets, food fillers, food mixes, drink mixes, drink or pop recipes, etc.) may also be included in a kit using materials as are well known in the cooking and baking arts.

The female mold body 2012 open end 2024 may be configured so as to fit and be positioned within the base 2014 or over and/or around the base depending on the desired mold design, but as shown and preferred elsewhere herein, such open end of a female mold body preferably fits over and around the base.

The female mold body 2012 is preferably closed at its second end 2026 so as to receive a liquid mix, liquid for freezing or other bakeable or hardenable material within the interior mold space 2022 of the female mold body 2012. When being used to form a cake pop, e.g., the mold end 2026 would be positioned so as to face downwardly in order to retain the mix or other bakeable material to prevent spillage, including while baking in a traditional or convection oven or a microwave oven. The shape and size and dimensions may be varied as discussed above with respect to embodiments 10 and 1010. Once a cake pop or other molded treat forms, the user removes the female mold body. In this case, for baking, while a bakeable mold (like a cupcake tin) may be used, a bakeable solid material or elastomeric material (baking silicone) is preferred. When the cake or other molded treat (hard candy mold, gummy candy mold, cake mold, cupcake mold, etc.) is formed, the mold is removed. A solid treat can be formed using the female mold body and male mold body independently of the remaining mold assembly components, and when formed, the male mold body would be removed from the treat and the formed treat would be removed from the female mold body, preferably in a non-stick manner, and the solid food treat having a core therein could then be subsequently mounted on the base and handle assembly. However, it would be understood, based on this disclosure, that for frozen treats and also for solid treats, a suitable material which may be frangible or non-frangible may be used and the whole assembly could be formed of materials suitable to allow all parts to be baked, frozen, etc. without departing from the spirit and scope of the disclosure.

The female mold body 2012 has dimensions like those of the female mold body 1012 of embodiment 1010. It is preferred that the female mold body 2012 is sufficiently long to accommodate the male insert body while leaving a length $l_2$ as shown in FIG. 22 that leaves a solid treat top portion of a frozen pop or molded treat, respectively when the mold is used. Once the cake pop or other solid or molded treat is formed and removed from the female mold body 2012, it may be turned so that the core 2041 formed in the resulting formed cake treat 2037 is positioned to face an upper projection 2059 on the base 2014 of the assembly. The upper projection 2059 may be provided with a threaded exterior surface 2057 as shown in FIGS. 22 and 23. The threads (or another alternative gripping surface) may be used to push into the solid cake treat and pushed or twisted into the core 2041 of the treat to engage the formed material in the molded cake 2037. The user can then eat the top part of the cake pop or other molded treat, and expose the open area 2045 of the core 2041 of the cake pop or treat which would allow for the user to drink a second liquid or eat a second solid through the open core 2041 of the molded cake pop or molded treat, for example, the user could drink milk through a molded brownie pop, a liquid icing through a cake pop or one type of small candy (like a mini M&M® through a gummy candy pop (such as a large gummy bear or hard candy shaped-character).

The base 2014 has a support surface 2034 having a lower face 2038 and an upper face 2036. The base 2014 has an opening 2040 extending longitudinally therethrough. The opening enables a male mold insert body 2016 to fit within the mold if the base is used when forming the molded cake pop, or allows simply for liquid or solid filler to pass through the base 2014 to the core 2041 when the mold is fully assembled. The base 2014 is configured to be positioned so as to fit around or within the first end 2024 of the female mold body 2012, but may also be configured simply to be able to hold a cake pop or other solid or molded treat after it is separately formed and positioned on the base 2014 for consumption. The base 2014 supports by way of the support surface 2034 a cake pop or other molded treat formed in the interior space 2022 of the female mold body 2012 once positioned on the base for eating.

When the cake pop or molded treat is formed, and the cake or molded treat has been removed from the female mold body, the cake or molded treat is positioned to sit atop the upper face 2036 of the support surface 2034. The base may have general dimensions in height and width as noted above with respect to embodiments 10 or 1010.

The base has an optional upper projection 2059 having a threaded exterior surface 2057. The upper projection also has a passage in communication with and that is part of the opening 2040 extending through the base (see the same component as shown in embodiment 1010). A drip catcher 2072 which is as described with respect to embodiment 1010 is also shown and may be used for more messy cake pop or other molded pop treats or when a liquid filling is used, but it should be understood that it is optional and may also be used only for additional support in the mold or for versatility. In all other respects, the drip catcher 2072 is as described with respect to embodiment 1010.

The male insert mold body 2016 should still be able to easily slide into and remain centrally located in a generally upright or longitudinal position and aligned when extending into the female mold body 2012 during a baking or hardening process. If the base is positioned on the female mold body 2012 during formation of the treat, the male insert mold body 2016 should also be able to fit through the opening 2040 in the base 2014. The male insert mold body 2016 shown in this embodiment does not require a head as in embodiment 10, and is hollow instead of solid. However, it should be understood that these are a variation and that the male insert body 2016 can also be made to be solid and/or have a head.

The base 2014 includes a base connector piece 2042. The connector piece 2042 in the base 2014 is preferably configured to work with handle 2044. Handle 2044 as with handle 44, 1044 in embodiments 10, 1010, respectively, may have a variety of configurations, but is preferably attachable, detachable and re-attachable by way of a connector that mates with the base connector piece 2042. Such a connector piece may be a threaded end, a snap fit end, a friction fit end, a quick connect end, and the like and is not intended to be limited herein. In the present embodiment, the handle 2044 is also a receptacle 2046 in that it is solid but defines an interior space 2048 configured to hold liquid or a solid filler as with embodiment 10, 1010. The receptacle 2046 handle preferably has a first end 2050 having an opening 2052 therein. As shown, the opening is as wide as the first end 2050 of the receptacle, however, the opening 2052 may be formed so as to be smaller than the end 2050 of the receptacle such as a forced opening through a top surface.

The receptacle also has a receptacle connector piece 2054 which should preferably be configured so as to mate with the base connector piece 2042 for connecting the base 2014 to the receptacle 2046. When assembled, the receptacle as shown locks by mating connections, which as shown are threads 2049. Embodiment 2010, like embodiment 1010, illustrates use of external threads 2049 on the connector piece 2054 of the receptacle 2046 which mate with threads on the interior surface of the base (these features are shown in base 1014 for embodiment 1010 and are the same as are used in the present invention embodiment 2010). The threads tighten to hold the receptacle to the base. It will be understood to one skilled in the art, based on this disclosure, that a wide variety of fastening connection methods may be used, mating threads being preferred, but snap fit, friction fit, connectors and the like may also be employed within the scope of and without departing from the spirit of the invention.

After the cake pop or other molded treat is formed, the receptacle can be detached if desired to introduce into the interior space 2048 of the receptacle a second liquid or a solid filler, which may be the same or different than the cake pop material or other moldable solid. Thus, any of the liquids or moldable solids noted herein may be used.

Preferably, the receptacle connector piece 2054 and the base connector piece 2042 are releasably connectable to each other for installing and removing the receptacle.

The support surface may be formed of a variety of materials, such as molded polymeric materials, including composites thereof, and other food-grade approved surfaces such as wood, e.g., the materials issued for making frozen pop sticks. As with embodiments 10, 1010, a wood insert 2056 (also formed of a food-grade material) may provided to the base 2014. The wood insert should have an opening 2058 extending longitudinally therethrough preferably in line with the opening 2040 in the base 2014. The wood insert 2056 is preferably configured as a disc (or other shape conforming to the base) to be situated on the support surface 2034, on an upper face 2036 thereof, on the base 2014. Thus, the opening 2058 in the wood insert 2056 is situated so as to be in fluid communication with the opening 2040 in the base 2014. Upon use of the mold, the wood insert 2056 contacts a cake pop or other molded treat formed within the interior mold space of the female mold body.

The base 2014 preferably includes an upwardly and/or outwardly extending wall 2060. As shown, the wall extends outwardly from the support surface 2034 so as to extend directly upwardly. However, the wall could lean outwardly as well so as to be more "dish-like". The wall 2060 and the support surface 2034 together define a receiving area 2062 for holding a cake pop or other molded treat after assembly the mold for use with a baked cake 2037 or other solid formed material on the top thereof with the receptacle 2046 at the bottom. Thus, the wall 2060 acts to hold the bottom portion of a cake pop or other molded treat with enhanced stability, although this wall may be optional in this embodiment. It should be understood, however, that a wall may be omitted in certain embodiments and/or shaped differently than as shown. Further, if provided, the wall 2060 preferably conforms along a perimeter edge thereof to the shape of the base support surface 2034. The wall may be formed of any of the materials noted above with respect to embodiments 10, 1010.

The removable male insert mold body as shown and in the present embodiment has an elongated body piece 2064, a first end 2068 and an insert end 2070 and preferably has dimensions consistent with those noted above for male insert 16, 1016 in embodiments 10, 1010 respectively, and may also have a blunt or a pointed or curved insert end, omit a head if desired and also be hollow or solid. The size may be varied by preference depending on the shape of the mold and the amount of solid cake pop or molded treat desired at the top eating end and the width of the core designed for a given design configuration and taking into account the factors noted above with respect to embodiments 10, 1010. The male insert mold body is also preferably formed of a material such a those noted above and which does not stick to or bond to a liquid or moldable solid when the cake pop or other molded treat is formed so as to retain the structural integrity of the treat throughout the forming, baking or freezing process.

The frozen treats and other edible products formed based on the disclosure herein and various embodiments noted above can be produced at low cost and can provide various end applications for the resulting treats and products. Applications include alcoholic treats as noted above which enable a user to combine and mix flavored spirits with various flavors of molded frozen ice for a wide variety frozen alcoholic treats. As there is high demand in this area of the alcoholic beverage market, such treats provide a unique niche to satisfy an expanding consumer preference. The varieties introduced can vary greatly considering, for example, that just with respect to vodka, there are over forty flavored vodkas available for use. Thus, a user can make, for example, a treat formed from chocolate flavored vodka through strawberry flavored molded ice. Other flavored spirits, wine, champagne, etc. could be put in the hollow handle to match with flavored molded ice and create new combinations. Further, as noted above, liquids for drinking within a frozen molded treat can also be non-alcoholic, natural juice and juice concentrate drinks, Kool-Aid®, liquid fruit or vegetable combination drinks, water, iced tea, lemonade and the like.

The mold infused with a liquid center does not have to be a frozen treat. The mold could be used to incorporate a solid confection such as cookie, cake or brownie (e.g., there are now recipes available for microwave "mug" brownies and similar cake treats that could be made within the mold). This opens an alternative end application for the molds described herein as fun products for desserts, children's parties, etc.

The product end applications can also be used in marketing as the handles can be formed in a variety of shapes and/or a variety of female mold shapes can be provided beyond the conical shape shown in the drawings as an example so that the molds can be modified to capitalize on popular characters, brand symbols, geographic places, familiar shapes and the like.

As noted above, the mold can also be used for medical/health applications and for the vitamin supplement industry. Liquid health products are becoming more popular. The molds herein can be used as delivery systems for vitamin supplements such as, for example, vitamin $B_{12}$ or B complex, vitamin E, mineral oil and omega-3 supplements, carbohydrates, electrolytes, proteins, L-Arginine, health shakes and smoothies, and similar products. In the medical field, as noted above, the delivery system can be used to provide nutrients to those having difficulties taking medicine due to illness or an inability to swallow pills (including, for example, the elderly, those with gastroenterological or breathing issues, small children), or who are going through treatments that lead to nausea. It can also function as a easier way for babies and small children to intake Pedialyte®. Frozen treats have always been popular for people during illness as a palatable way to slowly intake fluids, to reduce fever or cool a sore throat as well as for medication. The frozen treats herein can satisfy all such uses with the added benefit of the ability to push liquid through a frozen treat.

Uses can also be envisioned for novelty and adult entertainment purposes or to create personalized or customized molds for gifts or personal enjoyment.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A mold for forming a frozen pop or molded treat, comprising
    a female mold body defining an interior mold space and having a first open end and a second end;
    a base having a support surface with an opening extending longitudinally therethrough, the base configured to be positioned around or within the first end of the female mold body and to support by the support surface a frozen pop or molded treat formed in the interior space of the female mold body; and
    a removable male insert mold body, wherein the male insert mold body is configured to be positioned within the female mold body in general longitudinal alignment with the opening in the support surface of the base, and wherein the removable male insert mold body is sized so as to extend longitudinally only partially along a length of the interior mold space within the female mold body so that upon using the mold, a frozen pop or molded treat is formed having a core space created by removal of the male insert mold body, the core space configured to receive and hold a second liquid and/or a solid so that a second liquid and/or solid positioned within the core would contact the frozen pop or molded treat.

2. The mold according to claim 1, wherein the base comprises a base connector piece.

3. The mold according to claim 2, wherein the mold further comprises a receptacle having a first end having an opening therein and an interior space configured for holding a liquid or a solid, the first end of the receptacle also having a receptacle connector piece configured to mate with the base connector piece for connecting the base to the receptacle.

4. The mold according to claim 3, wherein the receptacle connector piece and the base connector piece are releasably connectable to each other.

5. The mold according to claim 1, wherein the base comprises an upper projection defining a passage therethrough, wherein the passage is in communication with the opening in the base.

6. The mold according to claim 1, wherein the female mold body is closed at the second end so as to receive a liquid for freezing or for forming a solid treat within the interior mold space of the female mold body.

7. The mold according to claim 1, wherein the female mold body comprises one or more of a polymer material, an elastomer material, a paper material, a cardboard material, a foil material and combinations and laminates thereof.

8. The mold according to claim 1, wherein the female mold body material comprises a disposable material.

9. The mold according to claim 1, wherein the female mold body is formed of a frangible material.

10. The mold according to claim 9, wherein the female mold body comprises perforations for tearing and easy removal of the female mold body after using the mold to form a frozen pop within the interior mold space of the female mold body.

11. The mold according to claim 1, wherein the support surface of the base comprises wood.

12. The mold according to claim 1, further comprising a wood insert having an opening extending longitudinally therethrough and configured to be situated on the support surface of the base so that the opening in the wood insert is in communication with the opening in the base and so that upon use of the mold, the wood insert contacts a frozen pop or molded treat formed within the interior mold space of the female mold body.

13. The mold according to claim 1, wherein the base is configured to sit within the interior mold space of the female mold body when the mold is assembled.

14. The mold according to claim 1, wherein the base has a transverse cross-sectional configuration which is generally round.

15. The mold according to claim 1, wherein the base comprises a wall extending outwardly from the support surface so that the wall and the support surface together define a receiving area for holding a frozen pop or molded treat after using the mold.

16. The mold according to claim 1, wherein the core space has an opening at a first end in communication with the opening in the support surface of the base and a second closed end.

17. The mold according to claim 16, wherein the removable male insert mold body is an elongated pin having a head at one end thereof for pushing, in or pulling out the pin through the opening in the support surface.

18. The mold according to claim 16, wherein the base comprises an upper projection defining a passage therethrough, wherein the passage is configured to receive the male insert mold therethrough and the passage is in communication with the opening in the base.

19. The mold according to claim 18, wherein the upper projection comprises a threaded exterior surface for engaging a molded treat.

20. The mold according to claim 18, wherein the base comprises a base connector piece having an exterior threaded surface and an upwardly extending projection having a threaded exterior surface, and the mold further comprises a drip catcher having a radially outwardly and upwardly extending interior surface that defines an interior space and defines an opening extending longitudinally therethrough, wherein the interior surface within the opening has mating threads that are configured to engage the threaded exterior surface of the upwardly extending projection.

21. A mold for a frozen pop or molded treat, comprising,:
a female mold body having a base surface and a wall extending outwardly from the base surface, wherein the base surface and the wall together define an interior mold space;
a removable male insert mold body configured to be inserted so as to extend at least partially through the interior mold space of the female mold body, wherein the removable male insert mold body has a longitudinally extending portion and the mold has a cap portion on one end, wherein the cap portion is configured to mate with an edge of the wall of the female mold body on a side of the wall opposite the base surface
so that when the mold is used and the removable male insert mold body is removed from the female mold body to form a frozen pop or molded treat, a core space is formed having an opening at a first end, a closed second end and being capable of receiving and holding a liquid and/or a solid so that a second liquid and/or solid positioned within the core space would contact the frozen pop or molded treat.

22. The mold according to claim 21, wherein the cap portion is detachable from the longitudinally extending portion so that in use, when the male insert mold body is removed to form the core space, the core space is filled at least partially with a liquid and/or a solid, the cap portion is detached from the longitudinally extending portion of the male insert mold body, and the cap portion can be reattached to the wall.

23. The mold according to claim 21, wherein the base surface is detachable from the wall of the female mold portion.

24. The mold according to claim 23, wherein the cap portion further comprises an opening therein configured to receive the longitudinally extending portion of the male insert body and after using the mold once the cap portion is reattached to the wall, a user can drink and/or eat through the opening in the cap portion.

* * * * *